United States Patent
Nishi et al.

(10) Patent No.: US 7,636,293 B2
(45) Date of Patent: Dec. 22, 2009

(54) OPTICAL PICKUP DEVICE, RECORDER AND/OR REPRODUCER

(75) Inventors: Noriaki Nishi, Kanagawa (JP); Kenji Yamamoto, Kanagawa (JP); Takashi Kobayashi, Kanagawa (JP); Katsuhiro Shindo, Miyagi (JP); Yuhei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 811 days.

(21) Appl. No.: 11/168,477

(22) Filed: Jun. 29, 2005

(65) Prior Publication Data

US 2006/0007812 A1  Jan. 12, 2006

(30) Foreign Application Priority Data

Jul. 9, 2004  (JP) .............................. 2004-203814

(51) Int. Cl.
G11B 7/00 (2006.01)
(52) U.S. Cl. .................................. 369/112.24; 369/121
(58) Field of Classification Search .............. 369/44.37, 369/112.01, 112.24, 34.01
See application file for complete search history.

(56) References Cited

U.S. PATENT DOCUMENTS

| | | | |
|---|---|---|---|
| 5,471,456 A * | 11/1995 | Tokumaru et al. ...... | 369/112.24 |
| 5,892,749 A | 4/1999 | Yamanaka | |
| 6,449,235 B1 | 9/2002 | Kim et al. | |
| 6,940,798 B2 | 9/2005 | Noborimoto et al. | |
| 2004/0052509 A1 | 3/2004 | Shimada et al. | |
| 2004/0114495 A1 | 6/2004 | Kim et al. | |
| 2004/0190417 A1 * | 9/2004 | Watanabe et al. ........ | 369/53.11 |
| 2004/0213131 A1 * | 10/2004 | Kimura et al. ......... | 369/112.03 |
| 2005/0007906 A1 * | 1/2005 | Horinouchi et al. ...... | 369/44.37 |
| 2005/0128895 A1 | 6/2005 | Hoshino et al. | |

FOREIGN PATENT DOCUMENTS

| | | |
|---|---|---|
| EP | 1 596 383 A2 | 11/2005 |
| JP | 62-20149 | 1/1987 |
| JP | 09-128792 | 5/1997 |

(Continued)

OTHER PUBLICATIONS

U.S. Appl. No. 11/159,231, filed Jun. 23, 2005, Kobayashi.

(Continued)

Primary Examiner—Wayne R Young
Assistant Examiner—Lixi Chow
(74) Attorney, Agent, or Firm—Oblon, Spivak, McClelland, Maier & Neustadt, L.L.P.

(57) ABSTRACT

An optical system and pick-up device having an optical magnification suitable for three different optical disc formats and a light emitting means for emitting a laser beam having a wavelength corresponding to each disc in the optical system of the optical pickup for recording and/or reproducing an information signal to the optical discs. The optical pickup device has a first light emitting unit for emitting a laser beam having a first wavelength or a second wavelength, a second light emitting unit for emitting a laser beam having a third wavelength, a first collimator lens for transmitting the laser beams having the first or second wavelengths, a second collimator lens for transmitting the laser beam having the third wavelength, a first objective lens for transmitting the laser beams having the first or third wavelengths, and a second objective lens for transmitting the laser beam having the second wavelength.

17 Claims, 9 Drawing Sheets

FOREIGN PATENT DOCUMENTS

| | | |
|---|---|---|
| JP | 09-153229 | 6/1997 |
| JP | 11-259893 | 9/1999 |
| JP | 2000-187870 | 7/2000 |
| JP | 2001-126298 | 5/2001 |
| JP | 2001-160238 | 6/2001 |
| JP | 2002-074725 | 3/2002 |
| JP | 2002-245660 | 8/2002 |

OTHER PUBLICATIONS

U.S. Appl. No. 11/159,314, filed Jun. 23, 2005, Kobayashi.
U.S. Appl. No. 11/159,274, filed Jun. 23, 2005, Kobayashi.

* cited by examiner

OPTICAL PICKUP DEVICE, RECORDER AND/OR REPRODUCER

CROSS REFERENCES TO RELATED APPLICATIONS

The present invention contains subject matter related to Japanese Patent Application JP 2004-203814 filed in the Japanese Patent Office on Jul. 9, 2004, the entire contents of which being incorporated herein by reference.

BACKGROUND OF THE INVENTION

1. Field of the Invention

The present invention relates to an optical pickup device corresponding to an optical disc of at least three formats. The present invention particularly relates to an optical pickup device having a 2-wavelength laser element and a 1-wavelength laser element, and a collimating means having different refractive powers of two systems and an objective lens having two different focal lengths, and a recorder and/or reproducer using the same.

2. Description of Related Art

There is, heretofore, an optical pickup device for recording and/or reproducing an information signal to an optical disc having different formats, such as a CD (Compact Disc) and a DVD (Digital Versatile Disc). This optical pickup device has a laser element for DVD, a laser element for CD, a collimator lens, an objective lens and a light receiving element. The laser element for DVD is formed with a laser diode for emitting a laser beam having a wavelength of 660 nm and a coupling lens in one package, corresponding to the formats of the respective optical discs. The laser element for CD is formed with a laser diode for emitting a laser beam having a wavelength of 780 nm and a coupling lens in one package. The collimator lens parallelizes the laser beams emitted from the respective laser elements. The objective lens converges the respective laser beams to the signal recording surface of each optical disc. The light receiving element receives the reflected beam from each optical disc.

This pickup optical system comprises a laser element for emitting laser beams of two wavelengths and a coupling lens. In this manner, forward path magnifications of the CD light and the DVD light are optimized independently, corresponding to the two disc formats. Recently, in the optical disc, a laser beam in which a track pitch and a bit interval are narrowed and which has a wavelength of 405 nm band, is used, in addition to a CD and a DVD. In this manner, a BD (Blu-ray Disc) in which high recording density is achieved is provided. When an information recording and/or reproducing including such BD is considered, it is desired to set an optical system which can realize separate optical magnifications corresponding to three disc formats.

In the pickup optical system of a disc recorder and/or reproducer corresponding to these three optical discs, a light emitting means for emitting laser beams of three wavelength bands corresponding to the recording formats of the respective discs is required. Furthermore, a lens system having a magnification for converging the optical spot on the signal recording surface of each optical disc in an optical coupling efficiency sufficient to record and/or reproduce the optical spot is required.

Here, it is assumed that the laser beam emitted from the light emitting means for emitting a laser beam having three wavelength bands is incident on the optical disc by using a single optical path common for three wavelengths like a conventional optical pickup system. Then, there arises a difference in the optical magnifications of the lens system needed in response to the formats of the respective optical discs. Therefore, when the optical system is composed by using a lens having a numerical aperture suitable for the format of one optical disc, even if the laser beams corresponding to the other two optical discs pass this optical system, optimum incident angle and output angle are not obtained. As a result, the quantity of light on the signal recording surface of the disc becomes insufficient.

FIG. 1 shows one or a plurality of laser diodes 141, a collimator lens group 142 common for three waves, and an objective lens common for the three waves. The laser diode 141 emits laser beams having wavelengths of 405 nm, 660 nm and 780 nm corresponding to the BD, the DVD and the CD. The collimator lens group 142 parallelizes the laser beams of these wavelengths. The objective lens 143 converges the laser beams of the respective wavelengths to the signal recording surfaces of the corresponding optical discs. The objective lens 143 includes a lens 144, and a hologram element 145 for correcting a spherical aberration generated according to the numerical aperture and the difference of the thickness of cover layers of the optical discs in response to the laser beams of the respective wavelengths. Also, this collimator lens group 142 and the objective lens 143 have magnifications (for example, ten folds) capable of forming an optical spot of optical intensity sufficient to record and reproduce the laser beam having a wavelength of 405 nm on the signal recording surface of the BD, and it is assumed that they are fixed to the arrangement. In such an optical system, when recording of an information signal is performed with the laser beam having a wavelength of 405 nm, since the aperture is limited to a numerical aperture of 0.85 of the BD by a diaphragm (not shown) provided on the objective lens 143 or an actuator. From this, an effective angle of the laser beam incident on the collimator lens group 142 becomes 9.8°, and the luminous flux of the range is converged to the signal recording surface of the BD.

When an information signal is recorded with a laser beam having a wavelength of 660 nm for DVD by using this optical system, the aperture is limited to the numerical aperture of 0.65 of the DVD by the diaphragm (not shown) provided on the objective lens 143 or the actuator. From this, an effective angle of the laser beam incident on the collimator lens group 142 becomes 7.5°, and the luminous flux of the range is converged on the signal recording surface of the DVD. When the information signal is recorded with the laser beam having a wavelength of 780 nm for CD by using this optical system, the aperture is limited to a numerical aperture of 0.52 of the CD by a diaphragm (not shown) provided on the objective lens 143 or the actuator. From this, an effective angle of the laser beam incident on the collimator lens group 142 becomes 6.1°, and the luminous flux of the range is converged to the signal recording surface of the CD.

Here, when an optical system having a magnification of 10 folds is assumed, an effective angle of the laser beam for assuring a quantity of light necessary to record a signal of the BD is, though there is little actual example so far, 8 to 10° based on the present inventor's experiences. Then, no problem occurs when the laser beam is converged to the BD at the effective angle of the 9.8°. On the other hand, since there are many examples in which the effective angle of the laser beam for assuring the quantity of light necessary to record the signal of the DVD is generally designed to be about 11.5° to 14.5°, the quantity of light is insufficient with the laser beam incident at the effective angle of 7.5°. To detect the laser beam without problem, the effective angle of about 1.7 folds is required. There are many examples in which the effective angle of the laser beam for assuring the quantity of light necessary to record the signal of the CD is generally designed to be about 14.0° to 15.5°. Therefore, the quantity of light becomes insufficient with the laser beam incident at the effective angle of 6.1°, and to detect the laser beam without problem, the effective angle of about 2.5 folds is required.

When the difference of the effective angle is converted in terms of necessary laser emitting power, the power of about 2.3 folds is required in the case of the DVD, and the power of about 3.7 folds is required in the case of the CD. Generally, if the recording speed differs four times, the recording power necessary on the signal recording surface requires twice the recording power (2 times faster and 8 times faster, 4 times faster and 16 times faster, or the like). Therefore, in the case of the above-mentioned fixed magnification, even if the laser diode having the same optical output is used, the recording speed can realize only about ¼ in the case of the DVD and only about ¹⁄₁₆ in the case of the CD.

To deal with such problems, an optical system having three optical paths including three light emitting sources and three lens systems to realize the optimum magnifications corresponding to the respective laser beams are composed. Accordingly, when one lens system for realizing the optical magnification suitable for the three disc formats is composed, the number of components for constituting the optical system is increased, and its construction is complicated. Therefore, this optical system cannot respond to the requests of shortening the optical path of the pickup optical system and a size reduction of the pickup device, etc.

[Non-Patent Document 1] Nikkei Electronics, pages 24-25, Jun. 7, 2004.

SUMMARY OF THE INVENTION

Accordingly, it is desirable to provide an optical pickup device which realizes an optical system having an optical magnification suitable for each disc format between three optical discs and a light emitting means for emitting a laser beam having a wavelength corresponding to each disc in the optical system of the optical pickup for recording and/or reproducing an information signal to the optical discs and which prevents the number of components from being increased to simplify the composition of the optical system, thereby preventing the length of an optical path from being lengthened, the optical pickup from being increased in size.

To solve the above-mentioned problems, an optical pickup device according to the present invention includes: a first light emitting unit for emitting a laser beam having a first wavelength and a laser beam having a second wavelength; a second light emitting unit for emitting a laser beam having a third wavelength; a first collimating means for transmitting the laser beam having the first wavelength or the laser beam having the second wavelength; a second collimating means for transmitting the laser beam having the third wavelength; a first objective lens for transmitting the laser beam having the first wavelength transmitted through the first collimating means or the laser beam having the third wavelength transmitted through the second collimating means, and a second objective lens for transmitting the laser beam having the second wavelength transmitting the first collimating means.

A recorder and/or reproducer according to the present invention includes: a first light emitting unit for emitting a laser beam having a first wavelength and a laser beam having a second wavelength; a second light emitting unit for emitting a laser beam having a third wavelength; a first collimating means for transmitting the laser beam having the first wavelength or the laser beam having the second wavelength; a second collimating means for transmitting the laser beam having the third wavelength; a first objective lens for transmitting the laser beam having the first wavelength transmitted through the first collimating means or the laser beam having the third wavelength transmitted through the second collimating means, and a second objective lens for transmitting the laser beam having the second wavelength transmitting the first collimating means.

An optical pickup device according to the present invention includes: a first light emitting unit for emitting a laser beam having a first wavelength and a laser beam having a second wavelength; a first light receiving and emitting element having a light receiving unit for receiving the returning laser beam having the first wavelength and laser beam having the second wavelength reflected by an optical disc; a second light emitting unit for emitting a laser beam having a third wavelength; a second light receiving and emitting element having a light receiving unit for receiving the returning laser beam having the third wavelength; a first collimating means for transmitting the laser beam having the first wavelength or the laser beam having the second wavelength; a second collimating means for transmitting the laser beam having the third wavelength; a first objective lens for transmitting the laser beam having the first wavelength transmitted through the first collimating means or the laser beam having the third wavelength transmitted through the second collimating means; and a second objective lens for transmitting the laser beam having the second wavelength transmitted through the first collimating means.

According to the optical pickup device and the recorder and/or reproducer, the optical path having optimum magnifications to the first to the third laser beams emitted corresponding to the three optical discs having different formats can be formed by using the two light emitting units and the collimator lenses and two objective lenses. Therefore, the optical paths corresponding to the laser beams of the respective wavelengths can be commonly used, and the optical system having the optical magnifications suitable for the respective optical disc formats can be realized between the light emitting units for emitting the laser beam having the wavelengths corresponding to the respective optical discs and the respective optical discs without introducing the maximizing of the optical path of the pickup optical system.

DETAILED DESCRIPTION OF THE PREFERRED EMBODIMENTS

The optical pickup device according to the present invention will be described in detail with reference to the accompanying drawings. An optical pickup device 1 is a pickup device for recording and reproducing an information signal to three types of optical discs 2 of a CD, a DVD, or a BD, and realizes at least three types of optical magnifications optimum for at least three types of disc formats by an optical system 3 comprising two laser beam emitting units for emitting three types of wavelength lasers corresponding to the formats of the respective optical discs 2 and two collimator lenses provided corresponding to the respective laser beam emitting units, and two objective lenses on which to the laser beam transmitted through these collimator lenses is incident.

Figure 2:
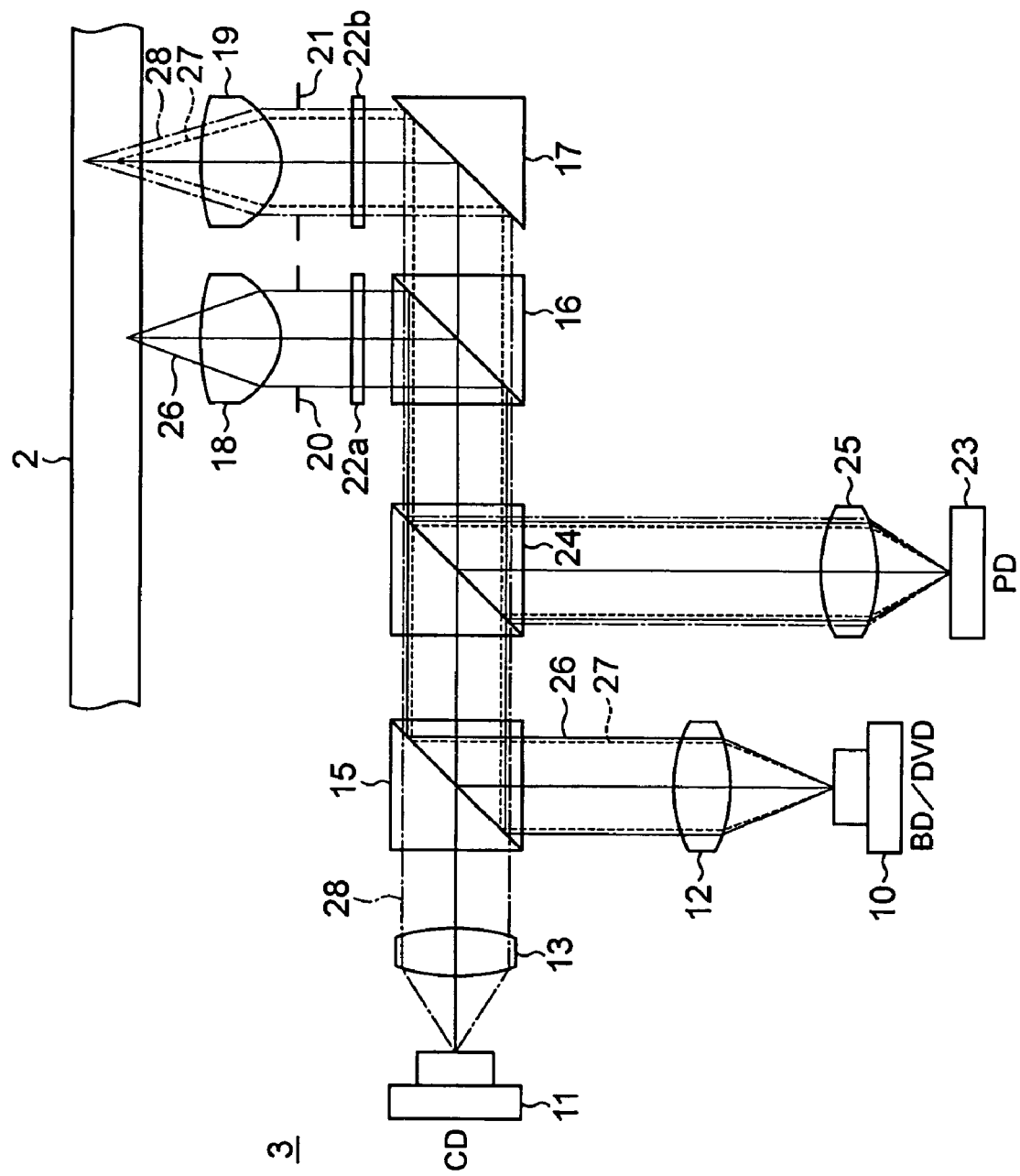
FIG. 2 is a structural view showing an optical system of an optical pickup device according to the present invention.

The optical system 3 of an optical pickup device 1 (an exemplary embodiment of which appears in FIG. 5) comprises: as shown in FIG. 2, a 2-wavelength laser diode 10 for emitting a laser beam having a wavelength of 405 nm corresponding to the BD and a laser beam having a wavelength of 660 nm corresponding to the DVD; a 1-wavelength laser diode 11 for emitting a laser beam having a wavelength of 780 nm corresponding to the CD; a first collimator lens 12 for converting the laser beam emitted from the 2-wavelength laser diode 10 into a predetermined divergent angle by each wavelength; a second collimator lens 13 for converting the laser beam emitted from the 1-wavelength laser diode 11 into a predetermined divergent angle; a first beam splitter 15 for transmitting the laser beam having a wavelength of 780 nm and reflecting the laser beam having a wavelength of 405 nm and the laser beam having a wavelength of 660 nm on the same optical path as the laser beam of the wavelength of 780 nm; a second beam splitter 16 for raising the laser beam having the wavelength of 405 nm to the optical disc 2 side and transmitting the laser beam having the wavelength of 660 nm and the laser beam having the wavelength of 780 nm; a rising mirror 17 for rising the laser beam having the wavelength of 660 nm and the laser light having the wavelength of 780 nm to the optical disc 2 side; a first objective lens 18 for converging the laser beam having the wavelength of 405 nm to the signal recording surface of the optical disc 2; a second objective lens 19 for converging the laser beam having the wavelength of 660 nm and the laser beam having the wavelength of 780 nm to the signal recording surface of the optical disc 2; a photodetector 23 for detecting the returning laser beam from the optical disc 2; and a polarization beam splitter 24 for reflecting the returning laser beam to the photodetector 23 side.

The 2-wavelength laser diode 10 contains two semiconductor laser chips as a laser beam emitting unit at an interval of several μm to several hundreds μm in one package. The laser beam having the wavelength of 405 nm corresponding to the BD is emitted from one emitting unit, and the laser beam having the wavelength of 660 nm corresponding to the DVD is emitted from the other emitting unit. The laser beam emitted from the 2-wavelength laser diode 10 is incident on the first collimator lens 12 provided on the optical path, and the beam of the effective angle range according to each wavelength is collimated by the first collimator lens 12 and outputted to the first beam splitter 15.

The 1-wavelength laser diode 11 contains one semiconductor laser chip as the laser beam emitting unit in one package. The laser beam having the wavelength of 780 nm corresponding to the CD is emitted from this emitting unit. The laser beam emitted from the 1-wavelength laser diode 11 is incident on the second collimator lens 13 provided on the optical path, and the light of the predetermined effective angle range is collimated by the second collimator lens 13 and emitted to the first beam splitter 15.

The first beam splitter 15 has a wavelength isolation characteristics, transmits the laser beam having the wavelength of 780 nm, and reflects the laser beam having the wavelength of 405 nm or the laser beam having the wavelength of 660 nm. Thus, the optical system 3 commonly uses the optical path of the laser beams having the wavelength of 405 nm, the laser beam having the wavelength of 660 nm and the laser beam having the wavelength of 780 nm.

On the optical path of the laser beam transmitted through or reflected on the first beam splitter 15 is arranged a polarization beam splitter 24 which makes the returning laser beam incident on the photodetector 23 to be described later, the second beam splitter 16 and the rising mirror 17. The second beam splitter 16 raises the laser beam having the wavelength of 405 nm reflected on the first beam splitter 15 to the optical disc 2 side, introduces the laser beam to the first objective lens 18, and reflects the returning laser beam from the optical disc 2 to the polarization beam splitter 24 side. The second beam splitter 16 transmits the laser beam having the wavelength of 660 nm reflected on the first beam splitter 15 and the laser beam having the wavelength of 780 nm transmitted through the first beam splitter 15 to the rising mirror 17, and transmits the returning laser beam reflected by the rising mirror 17 to the polarization beam splitter 24 side.

The rising mirror 17 raises the laser beam having the wavelength of 660 nm transmitted through the second beam splitter 16 and the laser beam having the wavelength of 780 nm to the optical disc 2 side, introduces the laser beams to the second objective lens 19, and reflects the returning laser beam from the optical disc 2 to the polarization beam splitter 24 side.

The first objective lens 18 is set to a numerical aperture with which the laser beam having the wavelength of 405 nm raised by the second beam splitter 16 can form an optical spot on the signal recording surface of the optical disc 2 by being provided with an aperture limiting means such as a diaphragm 20 and the like. The second objective lens 19 is set to a numerical aperture with which the laser beam having the wavelength of 660 nm raised by the rising mirror 17 and the laser beam having the wavelength of 780 nm can form an optical spot on the signal recording surface of the optical disc 2 by the diaphragm 21 and an aperture limiting means (not shown) provided on the objective lens 19.

¼-wavelength plates 22a, 22b for changing the polarization of the laser beam from a linear polarization beam into a circular polarization beam are provided between the second beam splitter 16 and the first objective lens 18 and between the rising mirror 17 and the second objective lens 19. The ¼-wavelength plates 22a, 22b convert the polarization direction of the laser beam at 90° in the forward path and the return path from each other, thereby preventing the interference of the laser beam of the forward path and the laser beam of the return path, and can reflect the laser beam of the return path to the photodetector 23 side by the polarization beam splitter 24.

The photodetector 23 for detecting the returning laser beam is formed as a light receiving element common for the three wavelengths. The returning laser beam reflected by the polarization beam splitter 24 is incident on a regulating lens 25, and condensed to the light receiving surface by the regulating lens 25.

The polarization beam splitter 24 for reflecting the returning laser beam to the photodetector 23 side transmits the laser beams having the wavelengths of 780 nm, 660 nm and 405 nm emitted by the first beam splitter 15 on the forward path as substantially P-polarized light, converts the polarization direction to the direction perpendicular to the forward path through the ¼-wavelength plates 22a and 22b, and reflects the entire quantity of the returning laser beam reflected by the second beam splitter 16 and the rising mirror 17 to the photodetector 23 side as a substantially S-polarized light.

According to the optical system 3 of the above-mentioned optical pickup device 1, the laser beam having the wavelength of 405 nm emitted from the 2-wavelength laser diode 10 is incident on the signal recording surface of the optical disc 2 through the first collimator lens 12, the first beam splitter 15, the second beam splitter 16 and the first objective lens 18. The laser beam having the wavelength of 405 nm is refracted via a first optical path 26 passing the first collimator lens 12 and the first objective lens 18 to connect the optical spot to the signal recording surface of the BD. The laser beam having the wavelength of 660 nm emitted from the 2-wavelength laser diode 10 is incident on the signal recording surface of the optical disc 2 through the first collimator lens 12, the first beam splitter 15, the rising mirror 17 and the second objective lens 19. The laser beam having the wavelength of 660 nm is refracted via a second optical path 27 passing the first collimator lens 12 and the second objective lens 19 to connect the optical spot to the signal recording surface of the DVD. Further, the laser beam having the wavelength of 780 nm emitted from the 1-wavelength laser diode 11 is incident on the signal recording surface of the optical disc 2 via the second collimator lens 13, the first beam splitter 15, the rising mirror 17 and the second objective lens 19. The laser beam having the wavelength of 780 nm is refracted through a third optical path passing the second collimator lens 13 and the second objective lens 19 to connect the optical spot to the recording surface of the CD.

More specifically, the optical system 3 according to the present invention forms the optical path having optimum magnifications to the laser beams having the wavelengths of 405 nm, 660 nm and 780 nm emitted corresponding to the three optical discs 2 having different formats of the BD, the DVD and the CD by using the two laser diodes and collimator lenses and the two objective lenses. Thus, the optical system 3 can commonly use the optical path corresponding to the laser beams of the respective wavelengths, and the optical system having optimum optical magnifications can be realized for the respective disc formats between the laser diode for emitting the laser beam having the wavelengths corresponding to the respective optical discs and the optical discs without increasing the length of the optical path of the pickup optical system.

In the optical system 3, the first, second collimator lenses 12, 13 and the first, second objective lenses 18, 19 for constituting the first to third optical paths 26 to 28 through which the laser beams of the respective wavelengths pass have the optimum optical magnification to record the BD by the laser beam having the wavelength of 405 nm passing through the first optical path 26, have the optimum optical magnification to record the DVD by the laser beam having the wavelength of 660 nm passing through the second optical path 27, and have the optimum optical magnification to record the CD by the laser beam having the wavelength of 780 nm passing through the third optical path 28.

The magnifications M in the respective wavelengths are displayed by a ratio ($M=F_C/F_{OBJ}$) of the focal length $F_{C1}$ or $F_{C2}$ of the first or second collimator lens 12 or 13, and the focal length $F_{OBJ1}$ or $F_{OBJ2}$ of the first or second objective lens 18 or 19. Thus, the optimum magnification $M_B$ of the first optical path 26 through which the laser beam having the wavelength of 405 nm for recording the BD passes becomes $M_B=F_{C1}/F_{OBJ1}$, the optimum magnification MD of the second optical path 27 through which the laser beam having the wavelength of 660 nm for recording the DVD passes becomes $M_D=F_{C1}/F_{OBJ2}$, and the optimum magnification MC of the third optical path 28 through which the laser beam having the wavelength of 780 nm for recording the CD passes becomes $M_C=F_{C2}/F_{OBJ2}$.

In this optical system 3, for example, as described above, when it is assumed that the optimum forward path magnifications $M_B$, $M_D$ and $M_C$ for the BD, the DVD and the CD are 10 folds, 6 folds and 4 folds from the relationship between the effective angle of the laser side and the numerical aperture NA of the objective lens, as one example of the focal lengths of the first, second collimator lenses 12, 13 and the focal lengths of the first, second objective lenses 18, 19 having such optimum magnifications, there are as shown in the following table.

TABLE 1

|  | NA | LD effective angle | LD side NA | Magnifications | Collimator f | Objective f |
| --- | --- | --- | --- | --- | --- | --- |
| CD | 0.52 | 14-15.5 | about 0.13 | 4 | 10 | 2.5 |
| DVD | 0.65 | 11.5-14.5 | about 0.11 | 6 | 15 | 2.5 |
| BD | 0.85 | 8.0-10.0 | about 0.085 | 10 | 15 | 1.5 |

The relation of this table 1 will be described. First, the focal length $F_{C1}$ of the first collimator lens 12 for constituting the first optical path 26 is set to 15, and the focal length $F_{OBJ1}$ of the first objective lens 18 is set to 1.5 (10=15/1.5) so that the first optical path 26 through which the laser beam having the wavelength of 405 nm passes satisfies the optimum magnification of 10 folds to record the BD.

The focal length $F_{C1}$ of the first collimator lens 12 for constituting the second optical path 27 through which the laser beam having the wavelength of 660 nm for recording the DVD is 15 from the above description, and since the magnification in the DVD is set to 6 folds, the focal length $F_{OBJ2}$ of the second objective lens 19 becomes 15/6=2.5.

Then, the focal length $F_{OBJ2}$ of the second objective lens 19 for constituting the third optical path 28 through which the laser beam having the wavelength of 780 nm for recording the CD passes is 2.5 from the above description, and since the magnification in the CD is set to 4 folds, the focal length $F_{C2}$ of the second collimator lens 13 becomes 2.5×4=10.

Figure 1:
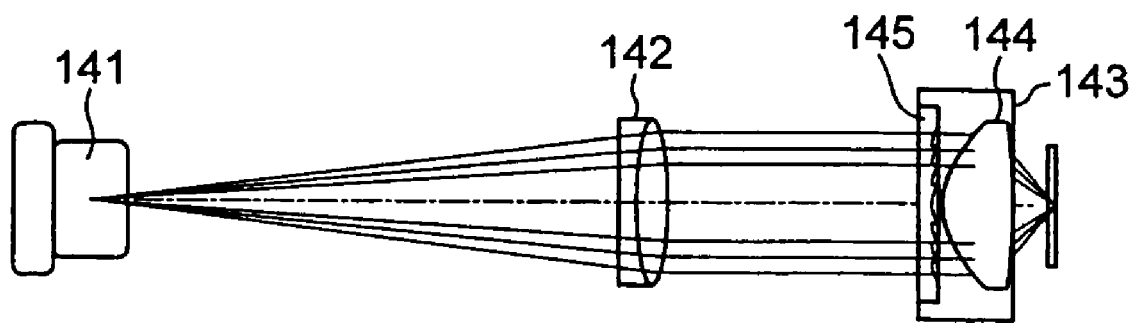
FIG. 1 is a view showing an optical system having one laser diode and one objective lens corresponding to three formats.

Thus, the optical system 3 comprises the first collimator lens 12 common for the laser beam having the wavelength of 405 nm and the laser beam having the wavelength of 660 nm, and the second objective lens 19 on which the laser beam having the wavelength of 660 nm is incident in addition to the first objective lens 18 on which the laser beam having the wavelength of 405 nm is incident. The second objective lens 19 has a laser side effective angle of 1.7 fold of the optical system (magnification of 1/1.7) common for the three waves in the collimator lens and the objective lens in FIG. 1 as described above. This is according to the fact that the focal length of the objective lens becomes 2.5/1.5=1.7 folds when the collimator lenses are common.

Also, the optical system 3 comprises the second collimator lens 13 on which the laser beam having the wavelength of 780 nm is incident in addition to the first collimator lens 12 on which the laser beam having the wavelength of 405 nm and the laser beam having the wavelength of 660 nm are incident while the second objective lens 19 is common for the laser beam having the wavelength of 660 nm and the laser beam having the wavelength of 780 nm. To construct the optimum magnification to record the CD, the second collimator lens 13 and the second objective lens 19 have a laser side effective angle of 2.5 folds of the optical system which is common for the three waves in the collimator lenses and the objective lenses in FIG. 1 as described above (the magnification of 1/2.5), and this is obtained from the fact that the focal length of the collimator becomes 10/15=1/1.5, the focal length of the objective lens becomes 1.7×(1/1.5)=2.5 folds from 2.5/1.5=1.7 folds.

According to the optical system 3 for constituting the first to third optical paths 26 to 28 by the first, second collimator lenses 12, 13 and the first, second objective lenses 18, 19 having the optical magnifications as described above, the optical path for constituting the three optical magnifications corresponding to the three formats can be realized between the two laser diodes 10, 11 and the two objective lenses 18, 19 without introducing lengthening of the optical path and without a size increase of the pickup optical system. Thus, the optimum optical magnification in the optical system of the respective formats is obtained, and the laser beams of the respective wavelengths can be condensed in the optimum quantity of the beam on the optical disc of the respective formats. Therefore, an inconvenience of the decrease of the recording speed at the information signal recording time can be prevented, and the recording characteristics by the optimum recording quantity of the beam are maintained with a simple construction, and hence a desired recording speed can be realized.

Figure 3:
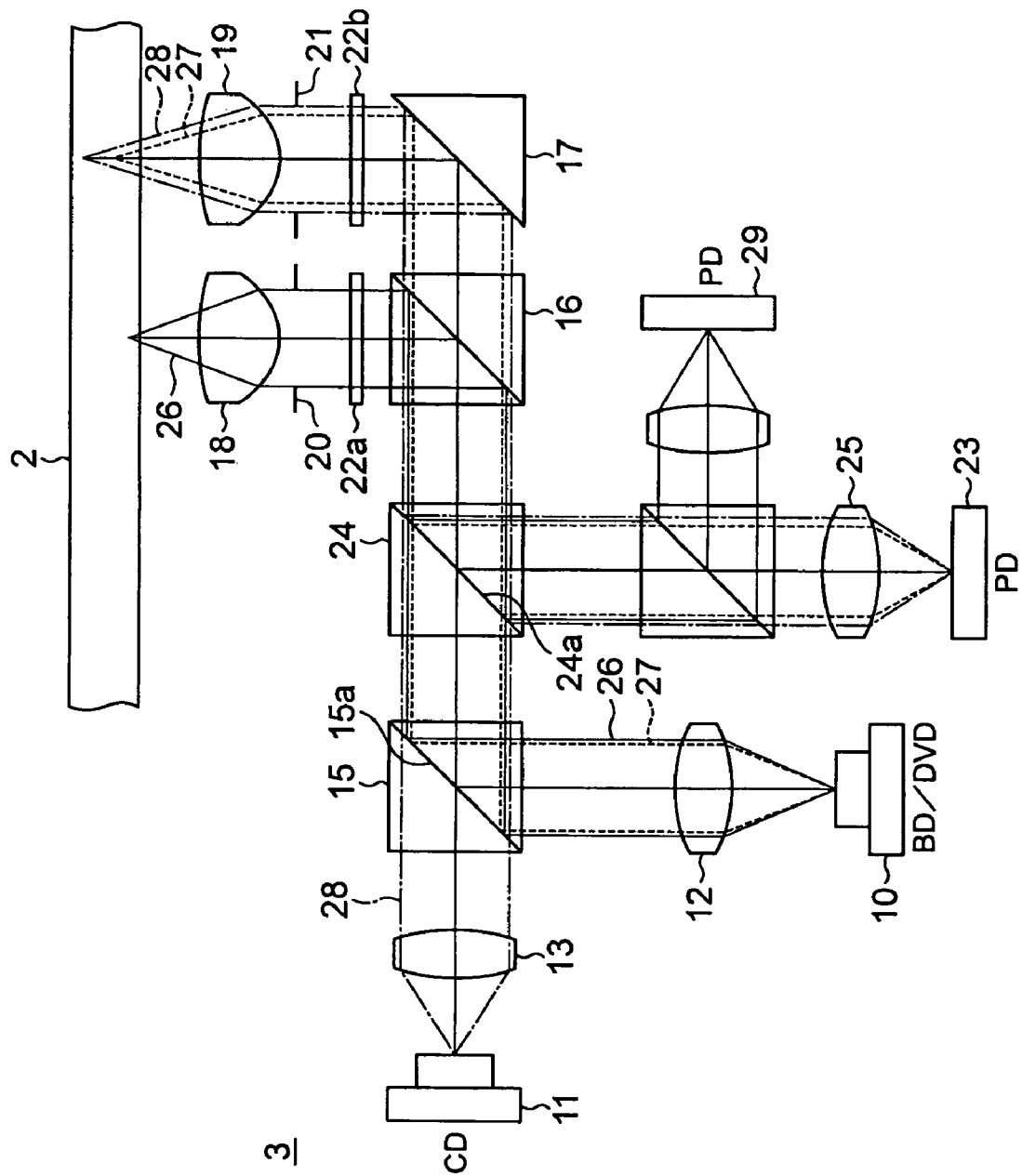
FIG. 3 is a structural view showing another example of the optical system of the optical pickup device according to the present invention.

Incidentally, in this optical system 3, when the returning laser beam is detected by a plurality of photodetectors according to the wavelengths, as shown in FIG. 3, a photodetector 29 is further arranged between the polarization beam splitter 24 and the regulating lens 25 through the regulating lens and the beam splitter. For example, the returning laser beam having the wavelength of 405 nm may be detected by the photodetector 23 and the returning laser beams having the wavelengths of 660 nm and 780 nm may be detected by the photodetector 29.

In the optical system of the optical pickup device to which the present invention is applied, not only the case where the laser beam having the wavelength of 405 nm and the laser beam having the wavelength of 660 nm are emitted from the one 2-wavelength laser diode, and the laser beam having the wavelength of 660 nm and the laser beam having the wavelength of 780 nm are incident on the one objective lens, but also the case where the laser beam having the wavelength of 660 nm and the laser beam having the wavelength of 780 nm are emitted from the one 2-wavelength laser diode and the laser beam having the wavelength of 405 nm and the laser beam having the wavelength of 660 nm may be incident on the one objective lens is possible.

Figure 4:
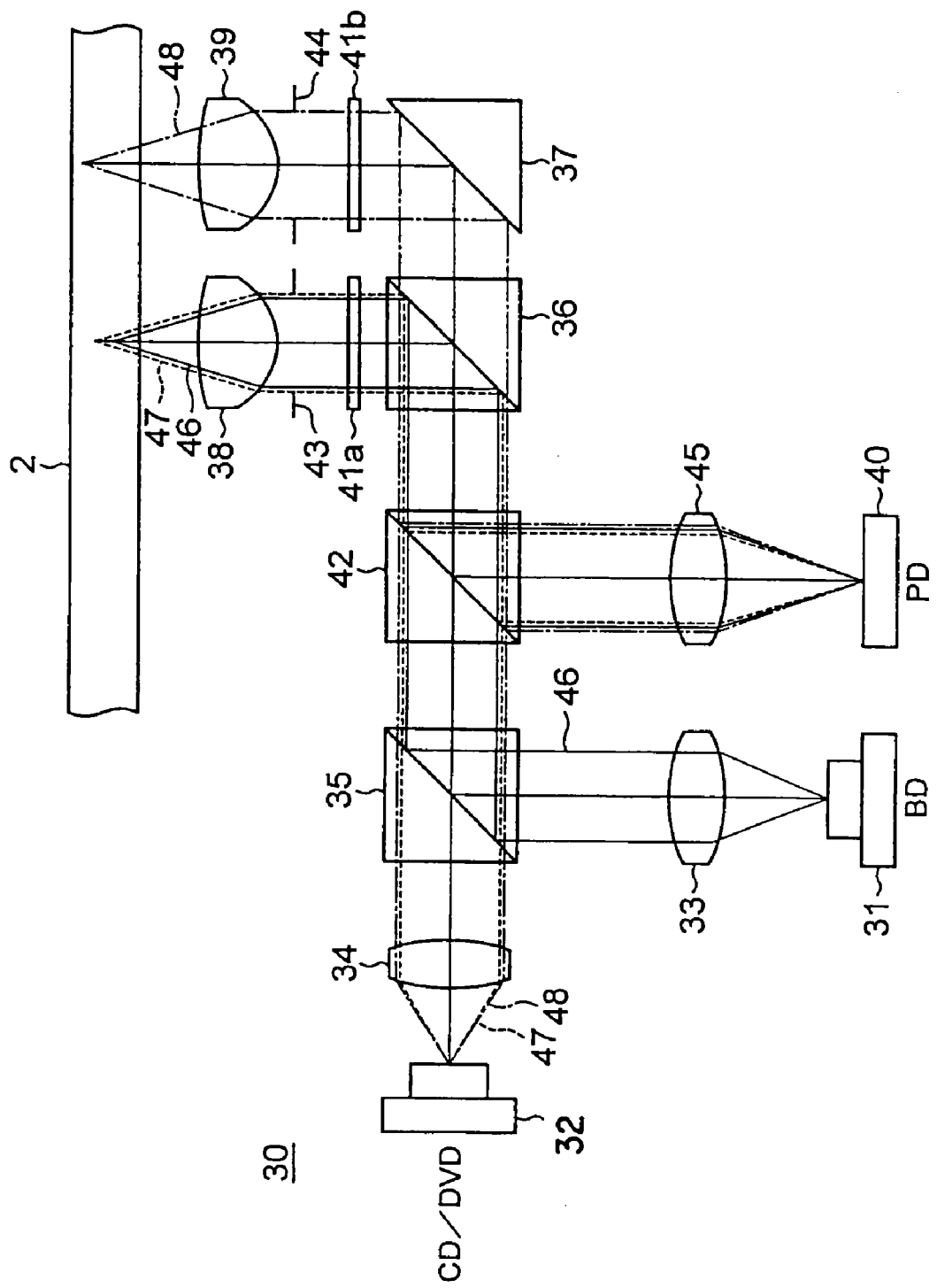
FIG. 4 is a structural view showing another optical system of the optical pickup device according to the present invention.

Specifically, this optical system 30 comprises: as shown in FIG. 4, a 1-wavelength laser diode 31 for emitting a laser beam having a wavelength of 405 nm corresponding to the BD; a 2-wavelength laser diode 32 for emitting a laser beam having a wavelength of 660 nm corresponding to the DVD and a laser beam having a wavelength of 780 nm corresponding to the CD; a first collimator lens 33 for converting the laser beam emitted from the 1-wavelength laser diode 31 into a predetermined divergent angle; a second collimator lens 34 for converting the laser beam emitted from the 2-wavelength laser diode 32 into a predetermined divergent angle by each wavelength; a first beam splitter 35 for transmitting the laser beam having the wavelength of 660 nm and the laser beam having the wavelength of 780 nm and reflecting the laser beam having the wavelength of 405 nm on the same optical path as the laser beam having the wavelength of 660 nm and the laser beam having the wavelength of 780 nm; a second beam splitter 36 for raising the laser beam having the wavelength of 405 nm and the laser beam having the wavelength of 660 nm to the optical disc 2 side and transmitting the laser beam having the wavelength of 780 nm; a rising mirror 37 for raising the laser beam having the wavelength of 780 nm to the optical disc 2 side; a first objective lens 38 for converging the laser beam having the wavelength of 405 nm and the laser beam having the wavelength of 660 nm to the signal recording surface of the optical disc 2; a second objective lens 39 for converging the laser beam having the wavelength of 780 nm to the signal recording surface of the optical disc 2; a photodetector 40 for detecting the returning laser beam from the optical disc 2, and a polarization beam splitter 42 for reflecting the returning laser beam to the photodetector 40 side.

Even in this optical system 30, similarly to the optical system 3, the laser beams having the wavelength of 405 nm and the wavelength of 660 nm raised by the second beam splitter 36 are set to a numerical aperture which can form the optical spot on the signal recording surface of the optical disc 2 by an aperture limiting means (not shown) provided on a diaphragm 43 and the first objective lens 38 provided immediately before the first objective lens 38. Further, an aperture limiting means such as a diaphragm 44 is also provided immediately before the second objective lens 39, and the laser beam having the wavelength of 780 nm raised by the rising mirror 37 is set to the numerical aperture which can form the optical spot on the signal recording surface of the optical disc 2.

Further, a regulating lens 45 is arranged between the photodetector 40 for detecting the returning laser beam and the polarization beam splitter 42, and the returning laser beam is condensed to the light receiving surface of the photodetector 40 by this regulating lens 45.

¼-wavelength plates 41a, 41b for converting the polarization of the laser beam from a linear polarization into a circular polarization are respectively provided between the second beam splitter 36 and the first objective lens 38 and between the rising mirror 37 and the second objective lens 39. The ¼-wavelength plates 41a, 41b convert the polarization direction of the laser beam at 90° in the forward path and the return path from each other, thereby preventing the laser beam of the forward path and the laser beam of the return path, both of which passing the same optical path, from being interfered with each other and the laser beam of the return path can be reflected to the photodetector 40 side by the polarization beam splitter 42.

According to the optical system 30 as described above, the laser beam having the wavelength of 405 nm emitted from the 1-wavelength laser diode 31 is incident on the signal recording surface of the optical disc 2 through the first collimator lens 33, the first beam splitter 35, the second beam splitter 36 and the first objective lens 38. The laser beam having the wavelength of 405 nm is refracted via a first optical path 46 passing the first collimator lens 33 and the first objective lens 38 to connect the optical spot to the signal recording surface of the BD. Also, the laser beam having the wavelength of 660 nm emitted from the 2-wavelength laser diode 32 is incident on the signal recording surface of the optical disc 2 through the second collimator lens 34, the first beam splitter 35, the second beam splitter 36 and the first objective lens 38. The laser beam having the wavelength of 660 nm is refracted through a second optical path 47 passing the second collimator lens 34, and the first objective lens 38 to connect the optical spot to the signal recording surface of the DVD. Furthermore, the laser beam having the wavelength of 780 nm emitted from the 2-wavelength laser diode 32 is incident on the signal recording surface of the optical disc 2 through the second collimator lens 34, the first beam splitter 35, the rising mirror 37 and the second objective lens 39. The laser beam having the wavelength of 780 nm is refracted through a third optical path 48 passing the second collimator lens 34 and the second objective lens 39 to connect the optical spot to the signal recording surface of the CD.

More particularly, the optical system 30 forms optical paths having optimum magnifications to the laser beams having wavelengths of 405 nm, 660 nm and 780 nm emitted corresponding to the three optical discs 2 having three different formats of the BD, the DVD and the CD by using the two laser diodes and the collimator lenses and two objective lenses. Therefore, even in this optical system 30, the optical paths corresponding to the laser beams having the respective wavelengths can be commonly used, and the optical system having optical magnifications suitable for the respective disc formats can be realized between the laser diodes for emitting the laser beams having the wavelengths corresponding to the respective optical discs and the respective optical discs without introducing lengthening of the optical path of the pickup optical system.

In the optical system 30, the first, second collimator lenses 33, 34 and the first, second objective lenses 38, 39 for constituting the first to third optical paths 46 to 48 through which the laser beams of the respective wavelengths are passed, have the optimum optical magnification to record the BD by the laser beam having the wavelength of 405 nm passing through the first optical path 46, have the optimum optical magnification to record the DVD by the laser beam having the wavelength of 660 nm passing through the second optical path 47, and have the optimum optical magnification to record the CD by the laser beam having the wavelength of 780 nm passing through the third optical path 48.

As described above, the optimum magnifications M in the respective wavelengths are represented by a ratio ($M=F_C/F_{OBJ}$) of the focal length $F_{C1}$ or $F_{C2}$ of the first or second collimator lens 33 or 34, and the focal length $F_{OBJ1}$ or $F_{OBJ2}$ of the first or second objective lens 38 or 39. Thus, the optimum magnification MB of the first optical path 46 through which the laser beam having the wavelength of 405 nm for recording the BD passes becomes $M_B=F_{C1}/F_{OBJ1}$, the optimum magnification $M_D$ of the second optical path 47 through which the laser beam having the wavelength of 660 nm for recording the DVD passes becomes $M_D=F_{C2}/F_{OBJ1}$, and the optimum magnification $M_C$ of the third optical path 48 through which the laser beam having the wavelength of 780 nm for recording the CD passes becomes $M_C=F_{C2}/F_{OBJ2}$.

In this optical system 30, for example, as described above, when it is assumed that the optimum forward path magnifications $M_B$, $M_D$ and $M_C$ for the BD, the DVD and the CD are 10 folds, 6 folds and 4 folds from the relationship between the effective angle of the laser side and the numerical aperture NA of the objective lens, as one example of the focal lengths of the first, second collimator lenses 33, 34 and the focal lengths of the first, second objective lenses 38, 39 having such optimum magnifications, there are as shown in the following table.

TABLE 2

|  | NA | LD effective angle | LD side NA | Magnifications | Collimator f | Objective f |
|---|---|---|---|---|---|---|
| CD | 0.52 | 14-15.5 | about 0.13 | 4 | 9 | 2.25 |
| DVD | 0.65 | 11.5-14.5 | about 0.11 | 6 | 9 | 1.5 |
| BD | 0.85 | 8.0-10.0 | about 0.085 | 10 | 15 | 1.5 |

The relation of this table 2 will be described. First, the focal length $F_{C1}$ of the first collimator lens 33 for constituting the first optical path 46 is set to 15, and the focal length $F_{OBJ1}$ of the first objective lens 38 is set to 1.5 (10 =15/1.5) so that the first optical path through which the laser beam having the wavelength of 405 nm passes satisfies the optimum magnification of 10 folds to record the BD.

The focal length $F_{OBJ1}$ of the first collimator lens 33 for constituting the second optical path 47 through which the laser beam having the wavelength of 660 nm for recording the DVD passes is 1.5 from the above description, and since the magnification in the DVD is set to 6 folds, the focal length $F_{C2}$ of the second collimator lens 34 becomes 1.5×6 =9.

Then, the focal length $F_{C2}$ of the second collimator lens 34 for constituting the third optical path 48 through which the laser beam having the wavelength of 780 nm for recording the CD is 9 from the above description, and since the magnification in the CD is set to 4 folds, the focal length $F_{OBJ2}$ of the second objective lens 39 becomes 9/4=2.25.

Thus, the optical system 30 comprises the first objective lens 38 common for the laser beam having the wavelength of 405 nm and the laser beam having the wavelength of 660 nm, and the second collimator lens 34 on which the laser beams having the wavelength of 660 nm and the wavelength of 780 nm are incident in addition to the first collimator lens 33 on which the laser beam having the wavelength of 660 nm is incident. The second collimator lens 34 has a laser side effective angle of 1.7 fold of the optical system (magnification of 1/1.7) common for the three waves in the collimator lens and the objective lens in FIG. 1 as described above. This is according to the fact that the focal length of the collimator lens becomes 15/9=1.7 folds when the objective lenses are common.

Also, the optical system 3 comprises the second objective lens 39 on which the laser beam having the wavelength of 780 nm is incident, in addition to the first objective lens 38 on which the laser beam having the wavelength of 405 nm and the laser beam having the wavelength of 660 nm are incident while the second collimator lens 34 is common for the laser beam having the wavelength of 660 nm and the laser beam having the wavelength of 780 nm. To construct the optimum magnification to record the CD, the second collimator lens 34 and the second objective lens 39 have a laser side effective angle of 2.5 folds of the optical system (magnification of 1/2.5) which is common for the three waves in the collimator lens and the objective lens in FIG. 1 as described above, and this is obtained from the fact that the focal length of the objective lens becomes 2.25/1.5=1.5, the focal length of the collimator lens becomes 1.7×(1.5)=2.5 folds from 15/9=1.7 folds.

According to the optical system 30 for constituting the first to third optical paths 46 to 48 by the first, second collimator lenses 33, 34 and the first, second objective lenses 38, 39 having the optical magnifications as described above, the optical path for constituting the three optical magnifications corresponding to the three formats can be realized between the two laser diodes 31, 32 and the two objective lenses 38, 39 without introducing lengthening of the optical path and without a size increase of the pickup optical system.

Incidentally, in this optical system 30, when the returning laser beam is detected by a plurality of photodetectors according to the wavelengths, as shown in FIG. 3, a regulating lens and a beam splitter are further arranged between the polarization beam splitter 42 and the regulating lens 45.

First Embodiment

Figure 5:
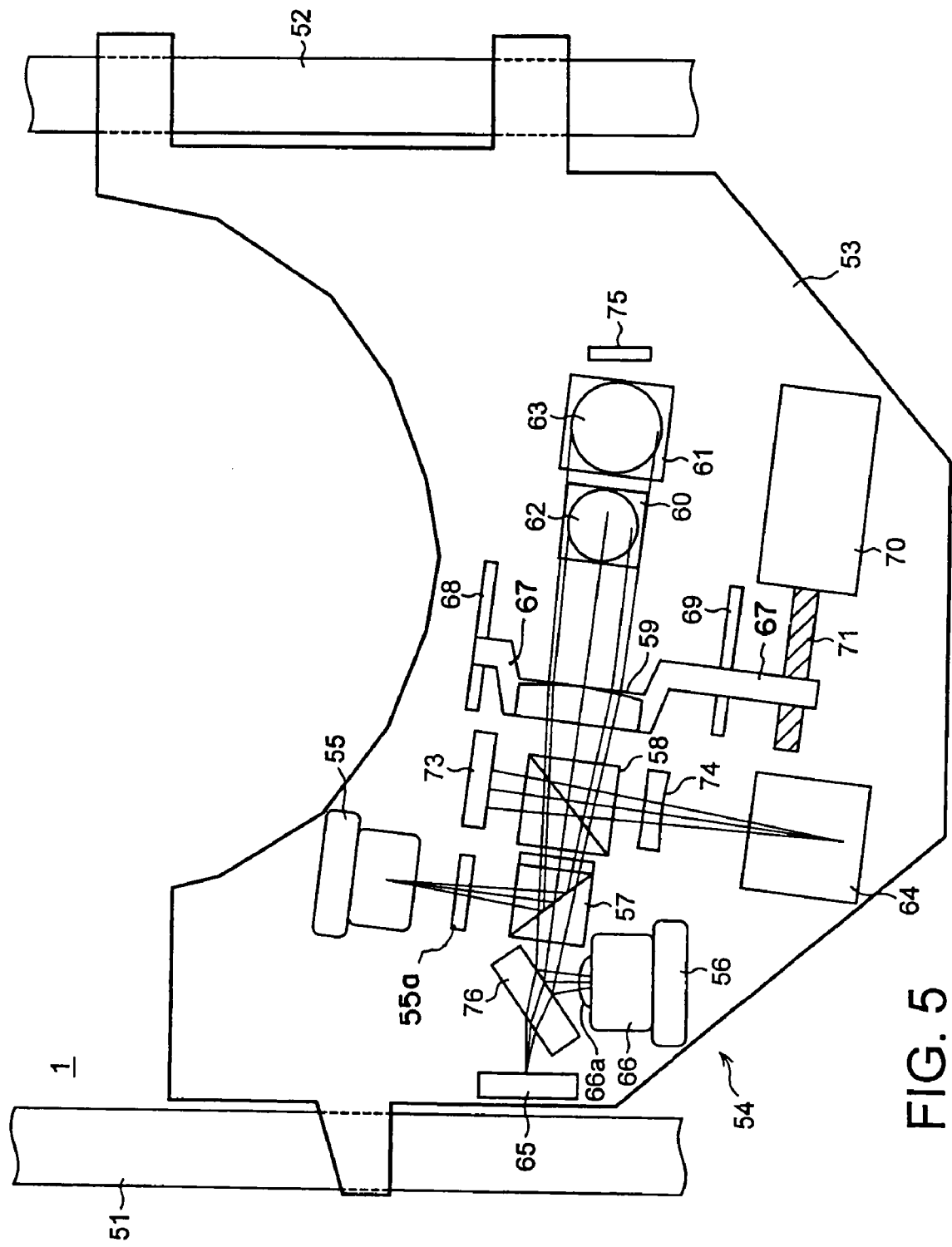
FIG. 5 is a view showing an embodiment of the optical pickup device according to the present invention.

Then, an embodiment of an optical pickup device 1 according to the present invention will be described. The optical pickup device 1 comprises, as shown in FIG. 5, a pickup base 53 supported by a pair of guide shafts 51, 52 arranged in a radial direction of the optical disc 2, and an optical system 54 formed in this pickup base 53. The optical system 54 comprises: a 2-wavelength laser diode 55 for emitting a laser beam having a wavelength of 405 nm corresponding to a BD and a laser beam having a wavelength of 660 nm corresponding to a DVD; a 1-wavelength laser diode 56 for emitting a laser beam having a wavelength of 780 nm corresponding to a CD; first and second polarization beam splitters 57, 58 each having a wavelength selectivity; a collimator lens 59 supported movably in the optical axis direction of the laser beam; a beam splitter 60 for reflecting the laser beam having the wavelength of 405 nm to the optical disc 2 side and transmitting the laser beams having the wavelengths of 660 nm and 780 nm; a rising mirror 61 for raising the laser beams having the wavelengths of 660 nm and 780 nm to the optical disc 2 side; a first objective lens 62 for converging the laser beam having the wavelength of 405 nm raised by the beam splitter 60 to a signal recording surface of the BD; a second objective lens 63 for converging the laser beams having the wavelengths of 660 nm and 780 nm raised by the rising mirror 61 to a signal recording surface of the DVD or the CD; a first photodetector 64 for detecting the returning laser beam having the wavelength of 405 nm reflected by the second polarization beam splitter 58; and a second photodetector 65 for detecting the returning laser beam having the wavelengths of 660 nm and 780 nm transmitted through the first polarization beam splitter 57.

The first and second polarization beam splitters 57, 58 having the wavelength selectivity used for this optical system 54 transmit or reflect according to the wavelength of the incident laser beam, and are formed, for example, by providing an optical thin film having a predetermined structure on the connecting surface of a prism. More particularly, the first polarization beam splitter 57 reflect the laser beam having the wavelength of 405 nm, transmits the laser beam having the wavelength of 780 nm, and transmits or reflects the laser beam having the wavelength of 660 nm in accordance with the polarization state. Also, the second polarization beam splitter 58 transmits the laser beam having the wavelength of 660 nm and the laser beam having the wavelength of 780 nm, and transmits or reflects the laser beam having the wavelength of 405 nm in accordance with the polarization state.

This optical system 54 comprises a structure that has collimator lens 59 in common for the three wavelengths and a coupling lens 66a for shortening a synthetic focal length only on a CD optical path by combining with the collimator lens 59, and connected to a CDLD package 66 containing a 1-wavelength laser diode 56 for emitting the laser beam having the wavelength of 780 nm, instead of providing two collimator lenses.

The 2-wavelength laser diode 55 is contained in a package containing a grating having a half-wavelength plate function to the laser beam having the wavelength of 660 nm.

Incidentally, the collimator lens 59 supported movably in an optical axis direction is supported at both ends of a lens holder 67, inserted into a pair of guide shafts 68, 69 extended in the optical axis direction, and engaged with the rotary shaft 71 of a drive motor 70. The collimator lens 59 can correct the spherical aberration in the BD and the DVD by moving the lens holder 67 in the optical axis direction.

In the optical system 54 as described above, the laser beam having the wavelength of 405 nm emitted from the 2-wavelength laser diode 55 passes a first optical path passing the collimator lens 59 and the first objective lens 62 set to a predetermined focal length, the laser beam having the wavelength of 660 nm emitted from the 2-wavelength laser diode 55 passes a second optical path passing the collimator lens 59 and the second objective lens 63 set to a predetermined focal length, and the laser beam having the wavelength of 780 nm emitted from the 1-wavelength laser diode 56 passes a third optical path passing the coupling lens 66a provided on the CDLD package 66, the collimator lens 59 and the second objective lens 63 set to a predetermined focal length, thereby constituting the optical paths having three optical magnifications corresponding to the three disc formats.

More particularly, the laser beam having the wavelength of 405 nm emitted from the 2-wavelength laser diode 55 is branched to three beams for generating a tracking error by a differential push-pull method via a grating having a half-wavelength plate function to the laser beam having the wavelength of 660 nm. Substantially entire quantity of the laser beam is reflected by the first polarization beam splitter 57. A polarization direction is rotated at a predetermined quantity by the wavelength plate operating as the half-wavelength plate only for the laser beam having the wavelength of 405 nm. The laser beam is partly transmitted through and partly reflected by the second polarization beam splitter 58. The laser beam transmitted through the second polarization beam splitter 58 transmits the collimator lens 59 set to a focal length to construct an optical magnification shown in the table 1 in advance, reflects to the optical disc 2 side by the beam splitter 60, and is incident on the first objective lens 62. The laser beam transmitting the second polarization beam splitter 58 is detected by the photodetector 73 to monitor the laser power.

Since the first optical path through which the laser beam having the wavelength of 405 nm passes is set to an optical path having an optimum optical magnification to record the BD by setting the collimator lens 59 and the first objective lens 62 to the focal length shown, for example, in the table 1, the laser beam having the wavelength of 405 nm is irradiated to the signal recording surface of the BD in a suitable amount.

The returning laser beam reflected to the BD is reflected by the beam splitter 60, transmitted through the collimator lens 59, and reflected to the first photodetector 64 side by the second polarization beam splitter 58. The returning laser beam is condensed to the light receiving surface of the first photodetector 64 via a regulating lens 74.

Also, the laser beam having the wavelength of 660 nm emitted from the 2-wavelength laser diode 55 is rotated to become substantially S-polarized light to the polarization beam splitter in the polarization direction by a grating 55a having half-wavelength plate function to the laser beam having the wavelength of 660 nm, branched to three beams for generating a tracking error by a differential push-pull method, and reflected in the entire quantity of the laser beam by the first polarization beam splitter 57. The laser beam reflected by the first polarization beam splitter 57 is transmitted through the second polarization beam splitter 58, transmitted through the collimator lens 59 and the beam splitter 60 set to a focal length to construct the optical magnification shown in the table 1 in advance, and is incident to the second objective lens 63 by the rising mirror 61 having a half mirror function. The laser beam is detected by a photodetector 75 for monitoring a laser power by partly being transmitted through the rising mirror 61.

Since the second optical path through which the laser beam having the wavelength of 660 nm passes is set to an optical path having the optimum optical magnification to record the DVD by setting the collimator lens 59 and the second objective lens 63 to the focal length shown, for example, in the table 1, the laser beam having the wavelength of 660 nm is irradiated to the signal recording surface of the DVD in the suitable quantity of the laser beam.

The returning laser beam reflected by the DVD is reflected by the rising mirror 61, passed through the collimator lens 59, the second polarization beam splitter 58, the first polarization beam splitter 57 and a half mirror 76 and detected by the second photodetector 65.

Also, the laser beam having the wavelength of 780 nm emitted from the 1-wavelength laser diode 56 is shortened at a synthetic focal length combined with the collimator lens 59 by the coupling lens 66a fixed to the CDLD package 66, reflected by the half mirror 76, transmitted through the first polarization beam splitter 57, the wavelength plate and the second polarization beam splitter 58, and is incident on the collimator lens 59 set to the focal length to construct the optical magnification shown in the table 1 in combination with the coupling lens 66a. The laser beam is transmitted through the collimator lens 59 and the beam splitter 60, and is incident on the second objective lens 63 via the rising mirror 61. The laser beam is detected by the photodetector 75 for monitoring the laser power by partly being transmitted through the rising mirror 61.

The third optical path through which the laser beam having the wavelength of 780 nm is passed, is set to an optical path having the optimum optical magnification to record the CD by setting the collimator lens 59 and the second objective lens 63 combined with the coupling lens 66a to the focal length, and, therefore, the laser beam having the wavelength of 780 nm is irradiated in a suitable quantity of the laser beam to the signal recording surface of the CD.

The returning laser beam reflected by the CD is reflected by the rising mirror 61, transmitted through the collimator lens 59, the second polarization beam splitter 58, the first polarization beam splitter 57 and the half mirror 76 and detected by the second photodetector 65.

Second Embodiment

Figure 6:
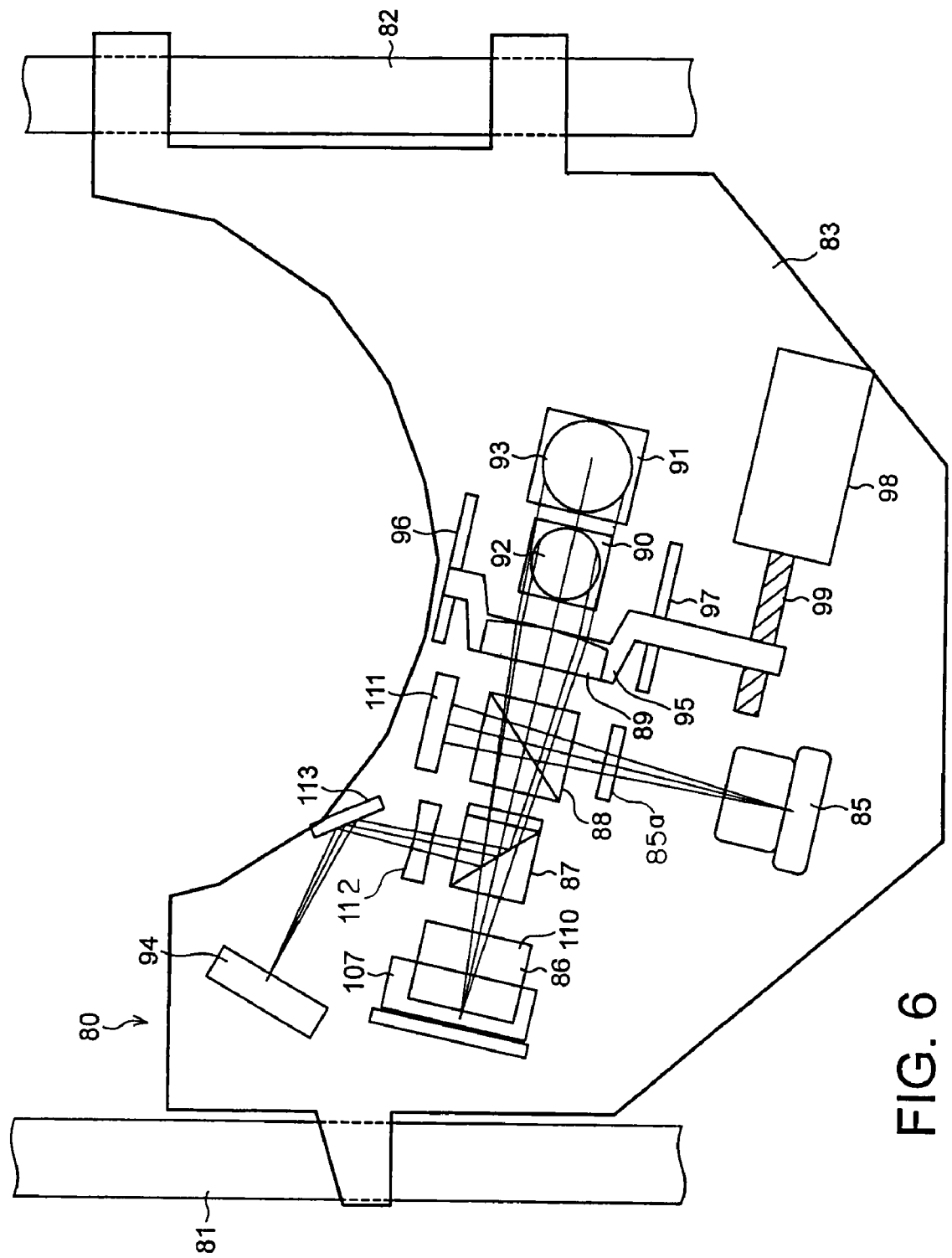
FIG. 6 is a view showing another embodiment of the optical pickup device according to the present invention.

Next, another embodiment of the optical pickup device 1 according to the present invention will be described. This optical pickup device 1 constitutes an optical system 80 by using a 2-wavelength semiconductor laser for emitting a laser beam having a wavelength of 660 nm and a laser beam having a wavelength of 780 nm, and a so-called laser coupler obtained by integrating, in a hybrid manner, photodetectors for receiving the reflected light from the optical disc 2 of these laser beams. As shown in FIG. 6, the optical pickup device 1 comprises a pickup base 83 supported by a pair of guide shafts 81, 82 arranged in a radial direction of the optical disc 2, and the optical system 80 is formed in the pickup base 83. The optical system 80 comprises: a 1-wavelength laser diode 85 for emitting the laser beam having the wavelength of 405 nm corresponding to the BD; a laser coupler 86 mounted with a receiving and emitting element of the laser beam having the wavelength of 780 nm corresponding to the CD and the laser beam having the wavelength of 660 nm corresponding to the DVD; first, second polarization beam splitters 87, 88 having wavelength selectivity; a collimator lens 89 supported movably in the optical axis direction of the laser beam; a beam splitter 90 for reflecting the laser beam having the wavelength of 405 nm and the laser beam having the wavelength of 660 nm to the optical disc 2 side and transmitting the laser beam having the wavelength of 780 nm; a rising mirror 91 for raising the laser beam having the wavelength of 780 nm to the optical disc 2 side; a first objective lens 92 for converging the laser beam having the wavelength of 405 nm and the laser beam having the wavelength of 660 nm raised by the beam splitter 90 to the signal recording surface of the BD or the DVD; a second objective lens 93 for converging the laser beam having the wavelength of 780 nm raised by the rising mirror 91 to the signal recording surface of the CD; and a photodetector 94 for detecting the returning laser beam having the wavelength of 405 nm reflected by the first polarization beam splitter 87.

Figure 7:
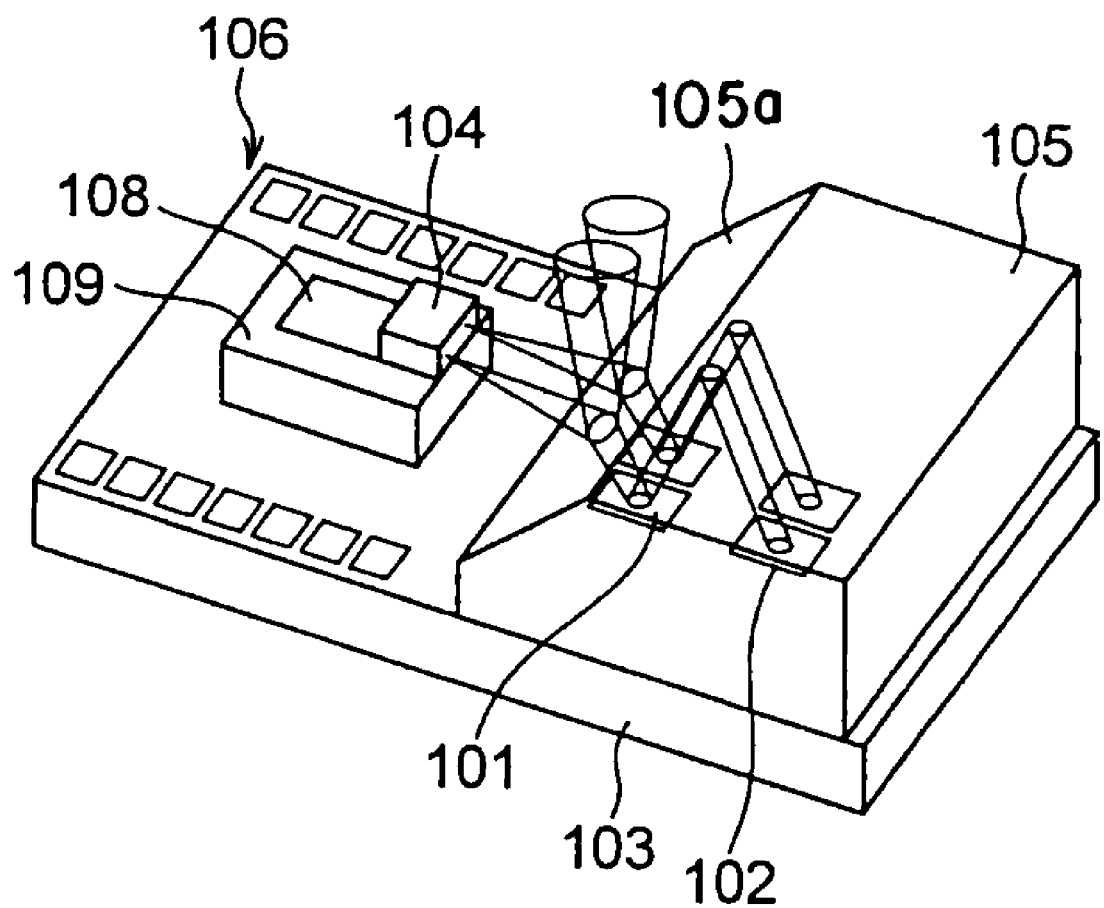
FIG. 7 is a perspective view showing a laser coupler.

The laser coupler 86 used for this optical system 80 is constructed, as shown in FIG. 7, by housing the laser coupler 106 in which a 2-wavelength laser diode 104 and a prism 105 of a light source of the laser beam having the wavelength of 660 nm and the laser beam having the wavelength of 780 nm are mounted on a silicon chip 103 having photodetectors 101, 102 for photodetecting the surface region, for example, in a flat package 107.

The 2-wavelength laser diode 104 is normally mounted on the silicon chip 103 through a photodiode chip 109 having a PIN photodiode 108 provided on the front region. The PIN photodiode 108 provided on the photodiode chip 109 monitors the laser beam emitted from the rear surface of the 2-wavelength laser diode 104 for the purpose of controlling the output of the 2-wavelength laser diode 104.

The emitted beam emitted from the front surface of the 2-wavelength laser diode 104 is reflected substantially perpendicularly on the oblique end face 105a of the prism 105, and guided, as shown in FIG. 6, from the collimator lens 89 and the first or second objective lens 92 or 93 to the signal recording surface of the optical disc 2 through the transparent cover glass on the upper surface of the flat package 107. On the other hand, the returning beam reflected by the signal recording surface of the optical disc 2 is advanced along the same route between the optical disc 2 and the flat package 107, is incident into the flat package 107. The laser beam transmitted through the oblique end face 105a of the prism 105 is detected by the photodetectors 101, 102 through the prism 105.

The first, second polarization beam splitters 87, 88 having wavelength selectively used for this optical system 80 transmit or reflect the incident laser beam according to the wavelength of the incident laser beam, and are, for example, provided with an optical thin film having a predetermined structure on the connecting surface of the prism. More specifically, the first, second polarization beam splitters 87, 88 transmit the laser beam having the wavelength of 660 nm and the laser beam having the wavelength of 780 nm and transmit or reflect the laser beam having the wavelength of 405 nm in response to the polarization state.

Also, even in this optical system 80, the collimator lens 89 common for the three wavelengths and a coupling lens 110 for shortening a synthetic focal length only for DVD/CD optical path by combining with this collimator lens 89 are disposed adjacent to the laser coupler 86, instead of comprising two collimator lenses.

Further, the 1-wavelength laser diode 85 is housed in a package formed with a grating 85a having a half wavelength plate function to the laser beam having the wavelength of 405 nm.

Incidentally, the collimator lens 89 supported movably to the optical axis direction is inserted at both ends of a lens holder 95 into a pair of guide shafts 96, 97 extended in the optical axis direction, and engaged with the rotary shaft 99 of a drive motor 98. The collimator lens 89 can correct a spherical aberration of the BD by moving the lens holder 95 in the optical axis direction.

In the optical system 80 as described above, the laser beam having the wavelength of 405 nm emitted from the 1-wavelength laser diode 85 is passed through a first optical path passing the collimator lens 89 and the first objective lens 92 set to a predetermined focal length, the laser beam having the wavelength of 660 nm emitted from the laser coupler 86 is passed through a second optical path passing the collimator lens 89 and the first objective lens 92 set to a predetermined focal length, and the laser beam having the wavelength of 780 nm emitted from the laser coupler 86 is passed through a third optical path passing the collimator lens 89 and the second objective lens 72 set to a predetermined focal length. Thus, the optical paths having the three optical magnifications corresponding to the three disc formats are formed.

More particularly, the laser beam having the wavelength of 405 nm emitted from the 1 wavelength laser diode 85 is rotated in the polarization direction at a predetermined quantity by the grating 85a having a half wavelength plate function, and branched into three beams for generating a tracking error signal by a differential push-pull method, reflected in the entire quantity on the first polarization beam splitter 87, partly transmitted through and partly reflected by the second polarization beam splitter 88. The laser beam transmitted through the second polarization beam splitter 88 is transmitted through the collimator lens 89 set to a focal length to construct the optimum optical magnification to record the BD together with the first objective lens 92 as shown in the table 2 in advance, reflected to the optical disc 2 side by the beam splitter 90, and is incident on the first objective lens 92. The laser beam transmitted through the second polarization beam splitter 88 is detected by a photodetector 111 for monitoring the laser power.

Since the first optical path through which the laser beam having the wavelength of 405 nm passes is set to an optical path having an optimum optical magnification to record the BD by setting, for example, the collimator lens 89 and the first objective lens 92 to the focal length as shown in the table 2, the laser beam having the wavelength of 405 nm is irradiated to the signal recording surface of the BD in a suitable quantity.

The returning laser beam reflected by the BD is reflected by the beam splitter 90, transmitted through the collimator lens 89 and the second polarization beam splitter 88, rotated at 90 in the polarization direction by the wavelength plate operating as a half wavelength plate only for the laser beam having the wavelength of 405 nm, and reflected to the photodetector 94 side by the first polarization beam splitter 87. The returning laser beam is condensed to the light receiving surface of the photodetector 94 through a regulating mirror 112 and a mirror 113.

Further, the laser beam having the wavelength of 660 nm emitted from the laser coupler 86 is transmitted through the first, second polarization beam splitters 87, 88, transmitted through the collimator lens 89 set to the focal length to construct the optimum optical magnification to record the DVD together with the first objective lens 92 as shown in the table 2 by combining with the coupling lens 110, reflected to the optical disc 2 side by the beam splitter 90, and is incident on the first objective lens 92.

The second optical path through which the laser beam having the wavelength of 660 nm passes is set to an optical path having the optimum optical magnification to record the DVD by setting the collimator lens 89 and the first objective lens 92 combined with the coupling lens 110 to the focal length as shown, for example, in the table 2, and, therefore, the laser beam having the wavelength of 660 nm is irradiated to the signal recording surface of the DVD in a suitable quantity.

The returning laser beam reflected by the DVD is reflected by the beam splitter 90, transmitted through the collimator lens 89, the second polarization beam splitter 88 and the first polarization beam splitter 87, and is incident into the laser coupler 86. The returning beam is transmitted through the oblique end face 105a of the prism 105, and detected by the photodetectors 101, 102 through the prism 105.

Also, the laser beam having the wavelength of 780 nm emitted from the laser coupler 86 is transmitted through the first, second polarization beam splitters 87, 88, transmitted through the collimator lens 89 and the beam splitter 90 set to the focal length to construct the optimum optical magnification to record the CD together with the second objective lens 93 as shown in the table 2 by combining with the coupling lens 110, reflected by the rising mirror 91, and is incident on the second objective lens 93.

The third optical path through which the laser beam having the wavelength of 780 nm passes is set to an optical path having an optimum optical magnification to record the CD by setting the collimator lens 89 and the second objective lens 93 combined with the coupling lens 110 to the focal length as shown, for example, in the table 2, and, therefore, the laser beam having the wavelength of 780 nm is irradiated to the signal recording surface of the CD in a suitable quantity.

The returning laser beam reflected by the CD is reflected by the rising mirror 91, transmitted through the collimator lens 89, the second polarization beam splitter 88 and the first polarization beam splitter 87, and is incident into the laser coupler 86. The returning beam is transmitted through the oblique end face 105a of the prism 105, and detected by the photodetectors 101, 102 through the prism 105.

In the foregoing description, the configuration that focuses attention on the optical path magnification in the forward path in which the laser beam is directed from the laser diode to the optical disc has been described. The optical pickup device according to the present invention can construct the optical system for constructing optimum three types of optical path magnifications suitable for the three disc formats in the return path in which the laser beam reflected by the optical disc is directed toward the light receiving element in addition to the optical path magnifications in the forward path. Incidentally, in the following description, the same members as the members described with respect to the optical system 3 and the optical system 30 described above are attached with the same reference numerals, and its detailed description will be omitted.

Figure 8:
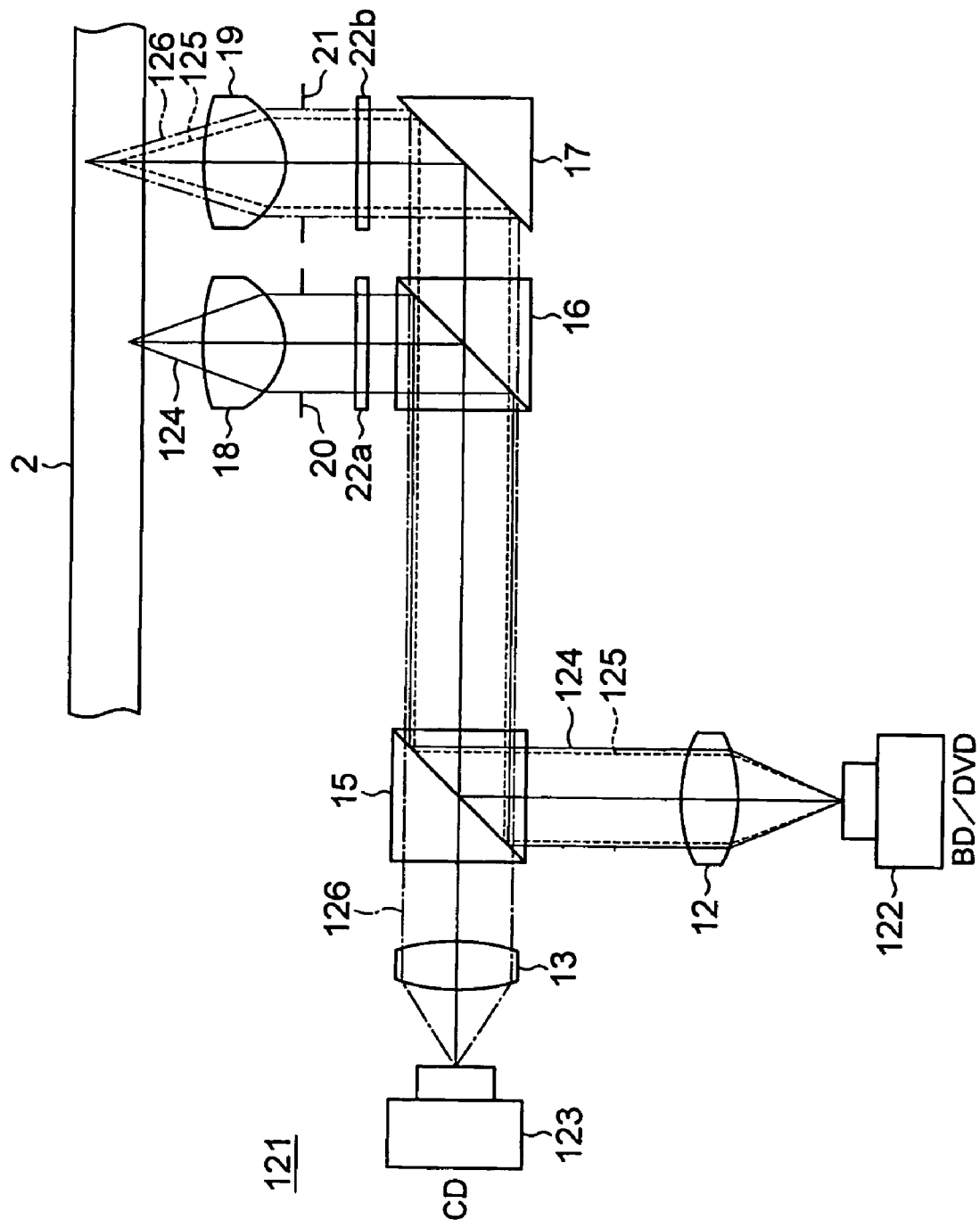
FIG. 8 is a structural view showing another example of the optical system of the optical pickup device according to the present invention.

An optical system 121 of an optical pickup device 1 (an exemplary embodiment of which appears in FIG. 5) comprises: as shown in FIG. 8, a 2-wavelength laser diode for emitting a laser beam having a wavelength of 405 nm corresponding to a BD and a laser beam having a wavelength of 660 nm corresponding to a DVD; a first laser coupler 122 mounted with a photodetector as a common light receiving element for detecting the returning light of the laser beam of the two wavelengths reflected by the optical disc 2; a 1-wavelength laser diode for emitting a laser beam having a wavelength of 780 nm corresponding to a CD; a second laser coupler 123 mounted with a photodetector as a light receiving element for detecting a returning light of the laser beam having the wavelength of 780 nm reflected by the optical disc 2; a first collimator lens 12 for converting a laser beam emitted from the first laser coupler 122 into a predetermined divergent angle; a second collimator lens 13 for converting a laser beam emitted from the second laser coupler 123 into a predetermined divergent angle; a first beam splitter 15 for transmitting the laser beam having the wavelength of 780 nm and reflecting the laser beam having the wavelength of 405 nm and the laser beam having the wavelength of 660 nm on the same optical path as the laser beam having the wavelength of 780 nm; a second beam splitter 16 for raising the laser beam having the wavelength of 405 nm to the optical disc 2 side and transmitting the laser beam having the wavelength of 660 nm and the laser beam having the wavelength of 780 nm; a rising mirror 17 for raising the laser beam having the wavelength of 660 nm and the laser beam having the wavelength of 780 nm to the optical disc 2 side; a first objective lens 18 for converging the laser beam having the wavelength of 405 nm to the signal recording surface of the optical disc 2; and a second objective lens 19 for converging the laser beam having the wavelength of 660 nm and the laser beam having the wavelength of 780 nm to the signal recording surface of the optical disc 2.

The first objective lens 18 is set to a numerical aperture with which the laser beam having the wavelength of 405 nm raised by the second beam splitter 16 can form an optical spot on the signal recording surface of the optical disc 2 by being provided with an aperture limiting means such as a diaphragm 20 and the like. The second objective lens 19 is set to a numerical aperture with which the laser beams having the wavelengths of 660 nm and 780 nm raised by the rising mirror 17 can form an optical spot on the signal recording surface of the optical disc 2 by the diaphragm 21 and an aperture limiting means (not shown) provided on the objective lens 19.

¼-wavelength plates 22a, 22b for converting the polarization of the laser beam from a linear polarization into a circular polarization are provided respectively between the second beam splitter 16 and the first objective lens 18, and between the rising mirror 17 and the second objective lens 19.

According to the optical system 121 as described above, the laser beam having the wavelength of 405 nm emitted from the first laser coupler 122 is incident on the signal recording surface of the optical disc 2 through the first collimator lens 12, the first beam splitter 15, the second beam splitter 16 and the first objective lens 18, the returning laser beam reflected by the signal recording surface of the optical disc 2 is incident into the first laser coupler 122 through the same route as the forward path, and detected by the photodetector. The laser beam having the wavelength of 405 nm is refracted through the first optical path 124 in which the returning light reflected by the optical disc 2 passes the first objective lens 18 and the first collimator lens 12 to connect the optical spot to the light receiving surface of the photodetector of the first laser coupler 122.

Further, the laser beam having the wavelength of 660 nm emitted from the first laser coupler 122 is incident on the signal recording surface of the optical disc 2 through the first collimator lens 12, the first beam splitter 15, the second beam spliltter 16, the rising mirror 17 and the second objective lens 19, the returning laser beam reflected by the signal recording surface of the optical disc 2 is incident on the first laser coupler 122 through the same route as the forward path, and detected by the photodetector. The laser beam having the wavelength of 660 nm is refracted through the second optical path 125 in which the returning beam reflected by the optical disc 2 passes through the second objective lens 19 and the first collimator lens 12 to connect the optical spot to the light receiving surface of the photodetector of the first laser coupler 122.

The laser beam having the wavelength of 780 nm emitted from the second laser coupler 123 is incident on the signal recording surface of the optical disc 2 through the second collimator lens 13, the first beam splitter 15, the second beam splitter 16, the rising mirror 17 and the second objective lens 19, and the returning laser beam reflected by the signal recording surface of the optical disc 2 is incident into the second laser coupler 123 through the same route as the forward path, and detected by the photodetector. The laser beam having the wavelength of 780 nm is refracted through the third optical path 126 in which the returning beam reflected by the optical disc 2 passes the second objective lens 19 and the second collimator lens 13 to connect the optical spot to the light receiving surface of the photodetector of the second laser coupler 123.

Here, as the amount relating deeply to the defocus margin in each disc format, there are a wavelength $\lambda$, a focal depth $Z$ to the numerical aperture NA of the objective lens. Here, the focal depth $Z=\lambda(NA^2)$. On the other hand, when the drawing range Spp of a focus error signal is a spot diameter $\Phi$ on PD, a numerical aperture NA of an objective lens, a return path magnification $\beta$ as an approximate value in a paraxial range, in the case of a general astigmatism method, a spot size method, $Spp=0.5\times\Phi/(NA\times\beta)$ is represented.

In the case of BD, DVD, and CD, for the simplicity, Spp=4 folds of Z, $\Phi$=75 µm are set, and a desired return path magnification is calculated. The following table 3 is obtained.

TABLE 3

|  | λ (µm) | NA | Z (µm) | Spp (µm) | β |
| --- | --- | --- | --- | --- | --- |
| CD | 0.785 | 0.52 | 2.9 | 12 | 6 |
| DVD | 0.66 | 0.65 | 1.6 | 6.2 | 9 |
| BD | 0.405 | 0.85 | 0.56 | 2.2 | 20 |

Thus, it is understood that the optimum magnification in the return path is different in each case of formats. Therefore, the first, second objective lenses 18, 19 and the first, second collimator lenses 12, 13 for constituting the first to third optical paths 124 to 126 realize the return path magnification P shown in the above table 3.

In the optical system of the optical pickup device according to the present invention, the laser beam having the wavelength of 405 nm and the laser beam having the wavelength of 660 nm are emitted from one laser coupler, and the laser beam having the wavelength of 660 nm and the laser beam having the wavelength of 780 nm are incident on one objective lens.

In addition, the laser beam having the wavelength of 660 nm and the laser beam having the wavelength of 780 nm may be emitted from one laser coupler and the laser beam having the wavelength of 405 nm and the laser beam having the wavelength 660 nm may be incident on one objective lens.

Figure 9:
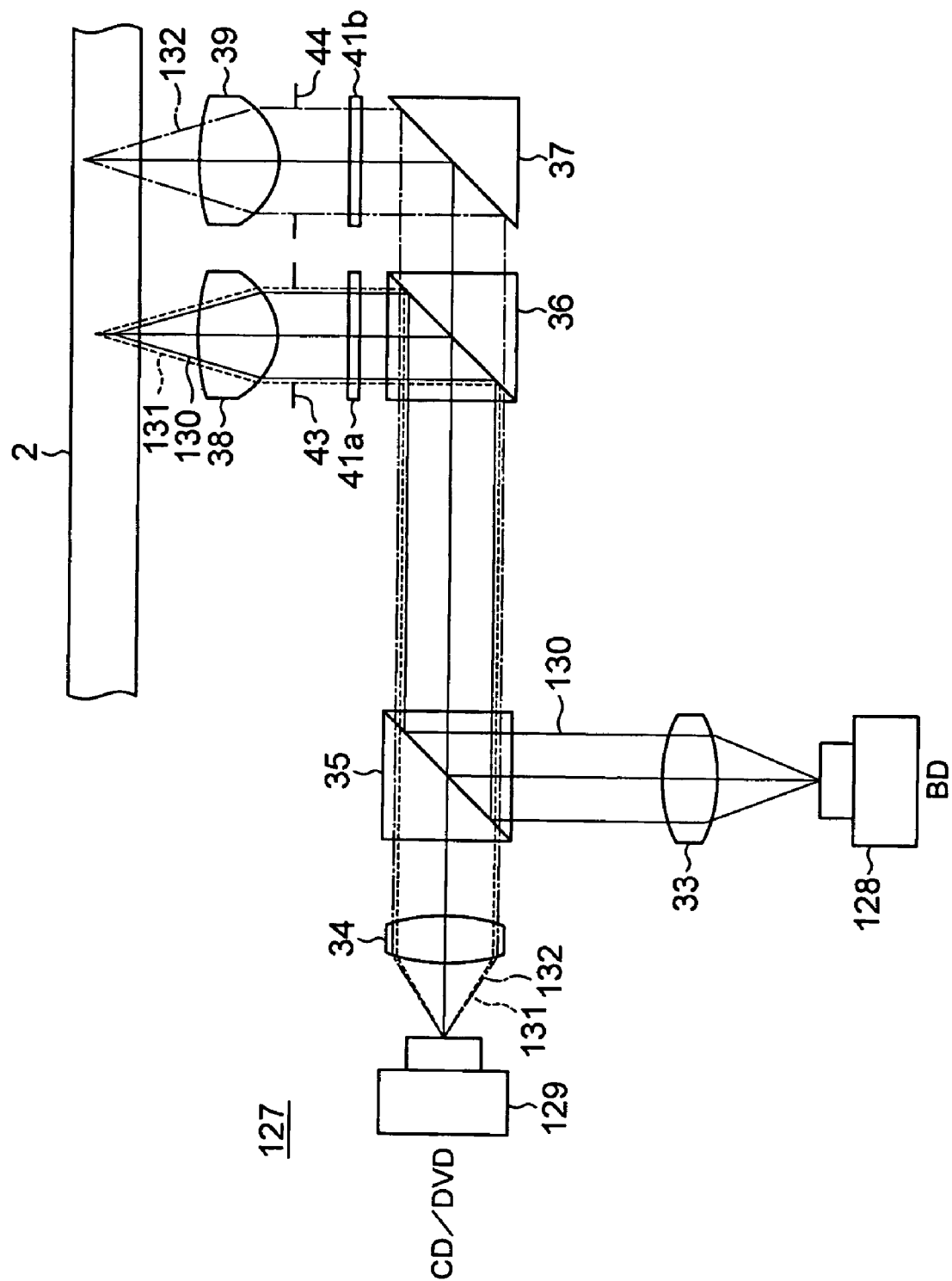
FIG. 9 is a structural view showing still another example of the optical system of the optical pickup device according to the present invention.

That is, this optical system 127 comprises: as shown in FIG. 9, a first laser coupler 128 mounted with a 1-wavelength laser diode for emitting the laser beam having the wavelength of 405 nm corresponding to the BD and a photodetector as a light receiving element for receiving the returning light of the laser beam having the wavelength of 405 nm reflected by the optical disc 2; a second laser coupler 129 mounted with a 2-wavelength laser diode for emitting a laser beam having the wavelength of 660 nm corresponding to the DVD and the laser beam having the wavelength of 780 nm corresponding to the CD and a photodetector as a common light receiving element for receiving the returning light of the laser beam having the wavelength of 660 nm reflected by the optical disc 2 and the laser beam having the wavelength of 780 nm; a first collimator lens 33 for converting the laser beam emitted from the first laser coupler 128 into a predetermined divergent angle; a second collimator lens 34 for converting the laser beam emitted from the second laser coupler 129 into a predetermined divergent angle by each wavelength; a first beam splitter 35 for transmitting the laser beam having the wavelength of 660 nm and the laser beam having the wavelength of 780 nm and reflecting the laser beam having the wavelength of 405 nm on the same optical path as the laser beams having the wavelengths of 660 nm and 780 nm; a second beam splitter 36 for raising he laser beam having the wavelength of 405 nm and the laser beam having the wavelength of 660 nm to the optical disc 2 side and transmitting the laser beam having the wavelength of 780 nm; a rising mirror 37 for raising the laser beam having the wavelength of 780 nm to the optical disc 2 side; a first objective lens 38 for converging the laser beam having the wavelength of 405 nm and the laser beam having the wavelength of 660 nm to the signal recording surface of the optical disc 2; and a second objective lens 39 for converging the laser beam having the wavelength of 780 nm to the signal recording surface of the optical disc 2.

The optical system 127, similarly to the optical system 121, is set to a numerical aperture with which the laser beams having the wavelengths of 405 nm and 660 nm raised by the second beam splitter 36 can form an optical spot on the signal recording surface of the optical disc 2 by the diaphragm 43 provided immediately before the first objective lens 38 and an aperture limiting means (not shown) provided on the objective lens 38. Further, there is provided an aperture limiting means such as a diaphragm 44 or the like immediately before the second objective lens 39, and the second objective lens 39 is set to a numerical aperture with which the laser beam having the wavelength of 780 nm raised by the rising mirror 37 can form an optical spot on the signal recording surface of the optical disc 2.

Further, ¼-wavelength plates 41a, 41b for converting the polarization of the laser beam from the linear polarization into the circular polarization are provided between the second beam splitter 36 and the first objective lens 38, and between the rising mirror 37 and the second objective lens 39.

According to the optical system 127 as describe above, the laser beam having the wavelength of 405 nm emitted from the first laser coupler 128 is incident on the signal recording surface of the optical disc 2 through the first collimator lens 33, the first beam splitter 35, the second beam splitter 36 and the first objective lens 38, and the returning laser beam reflected by the signal recording surface of the optical disc 2 is incident on the first laser coupler 128 through the same route as the forward path, and detected by the photodetector. The laser beam having the wavelength of 405 nm is refracted through the first optical path 130 in which the returning beam reflected by the optical disc 2 passes the first objective lens 38 and the first collimator lens 33 to connect the optical spot to the light receiving surface of the photodetector of the first laser coupler 128.

Also, the laser beam having the wavelength of 660 nm emitted from the second laser coupler 129 is incident on the signal recording surface of the optical disc 2 through the second collimator lens 34, the first beam splitter 35, the second beam splitter 36 and the first objective lens 38, and the returning laser beam reflected to the signal recording surface of the optical disc 2 is incident on the second laser coupler 129 through the same route as the forward path, and detected by the photodetector. The laser beam having the wavelength of 660 nm is refracted through a second optical path 131 in which the returning beam reflected by the optical disc 2 passes the first objective lens 38 and the second collimator lens 34 to connect the optical spot to the light receiving surface of the photodetector of the second laser coupler 129.

Also, the laser beam having the wavelength of 780 nm emitted from the second laser coupler 129 is incident on the signal recording surface of the optical disc 2 through the second collimator lens 34, the first beam splitter 35, the second beam splitter 36, the rising mirror 37 and the second objective lens 39. The returning laser beam reflected by the signal recording surface of the optical disc 2 is incident into the second laser coupler 129 through the same route as the forward path, and detected by the photodetector. The laser beam having the wavelength of 780 nm is refracted through the third optical path 132 in which the returning beam reflected by the optical disc 2 passes the second objective lens 39 and the second collimator lens 34 to connect the optical spot to the light receiving surface of the photodetector of the second laser coupler 29.

Even in this optical system 127, similarly to the optical system 121, since the optimum magnification on the return path is different at each wavelength and each format, the first, second objective lenses 38, 39 and the first, second collimator lenses 33, 34 for constituting the first to third optical paths 130 to 132 realize the return path magnification β shown in the table 3.

Incidentally, the collimator lens and the objective lens for constituting the optical system of the above-mentioned optical pickup device 1 have the optical magnification suitable to record an information signal to the optical disc 2. However, the optical pickup device according to the present invention may be constructed as an optical system having an optical magnification optimum to reproduce an information signal and an optical system having an optical magnification optimum for recording and/or reproducing an information signal.

Also, when the 2-wavelength laser diode is used instead of the 1-wavelength laser diode, an optical path having four optical magnifications corresponding to the optical disc having four different formats can be formed by using the first, second collimator lenses and the first, second objective lenses.

As the aperture limiting means provided immediately before the first, second objective lenses, a hologram having wavelength dependence that makes a numerical aperture 0.85 to the laser beam having the wavelength of 405 nm, 0.65 to the laser beam having the wavelength of 660 nm and 0.52 to the laser beam having the wavelength of 780 nm may be used.

It should be understood by those skilled in the art that various modifications, combinations, sub-combinations and alterations may occur depending on design requirements and

What is claimed is:

1. An optical pickup device comprising:
a first light emitting unit that emits a laser beam having a first wavelength and a laser beam having a second wavelength different from the first wavelength;
a second light emitting unit that emits a laser beam having a third wavelength longer than the first and second wavelengths;
first collimating means for transmitting the laser beam having the first wavelength and the laser beam having the second wavelength;
second collimating means for transmitting the laser beam having the third wavelength;
a first objective lens that transmits the laser beam having the first wavelength transmitted through the first collimating means or the laser beam having the third wavelength transmitted through the second collimating means; and
a second objective lens that transmits the laser beam having the second wavelength transmitted through the first collimating means.

2. The optical pickup device according to claim 1, wherein
the first collimating means and the first objective lens have a first magnification for converging the laser beam having the first wavelength to a signal recording surface of a first disc;
the first collimating means and the second objective lens have a second magnification for converging the laser beam having the second wavelength to a signal recording surface of a second disc; and
the second collimating means and the first objective lens have a third magnification for converging the laser beam having the third wavelength to a signal recording surface of a third disc.

3. The optical pickup device according to claim 1, wherein
the laser beam having the first wavelength is a laser beam having a wavelength of 660 nm band, the laser beam having the second wavelength is a laser beam having a wavelength of 405 nm band, and
the laser beam having the third wavelength is a laser beam having a wavelength of 785 nm band.

4. The optical pickup device according to claim 3, wherein
the first collimating means is a collimator lens, and
the second collimating means has a coupling lens and a collimator lens.

5. The optical pickup device according to claim 1, wherein the first and the second collimating means are collimator lenses.

6. A recorder and/or reproducer comprising:
a first light emitting unit that emits a laser beam having a first wavelength and a laser beam having a second wavelength different from the first wavelength;
a second light emitting unit that emits a laser beam having a third wavelength longer than the first and second wavelengths;
first collimating means for transmitting the laser beam having the first wavelength and the laser beam having the second wavelength;
second collimating means for transmitting the laser beam having the third wavelength;
a first objective lens that transmits the laser beam having the first wavelength transmitted through the first collimating means or the laser beam having the third wavelength transmitted through the second collimating means; and
a second objective lens that transmits the laser beam having the second wavelength transmitted through the first collimating means.

7. The recorder and/or reproducer according to claim 6, wherein
the first collimating means and the first objective lens have a first magnification for converging the laser beam having the first wavelength to a signal recording surface of a first disc;
the first collimating means and the second objective lens have a second magnification for converging the laser beam having the second wavelength to a signal recording surface of a second disc; and
the second collimating means and the first objective lens have a third magnification for converging the laser beam having the third wavelength to a signal recording surface of a third disc.

8. An optical pickup device comprising:
a first light receiving and emitting element having a first light emitting unit that emits a laser beam having a first wavelength and a laser beam having a second wavelength different from the first wavelength and a light receiving unit that receives the returning laser beam having the first wavelength and the laser beam having the second wavelength reflected by an optical disk;
a second light receiving and emitting element having a second light emitting unit that emits a laser beam having a third wavelength longer than the first and second wavelengths and a light receiving unit that receives the returning laser beam having the third wavelength and reflected by the optical disc;
first collimating means for transmitting the laser beam having the first wavelength and the laser beam having the second wavelength;
second collimating means for transmitting the laser beam having the third wavelength;
a first objective lens that transmits the laser beam having the first wavelength transmitted through the first collimating means or the laser beam having the third wavelength transmitted through the second collimating means; and
a second objective lens that transmits the laser beam having the second wavelength transmitted through the first collimating means.

9. The optical pickup device according to claim 8, wherein
the first objective lens and the first collimating means have a first magnification for converging the laser beam having the first wavelength and reflected by the optical disc to the light receiving unit of the first receiving and emitting element;
the second objective lens and the first collimating means have a second magnification for converging the laser beam having the second wavelength and reflected by the optical disc to the light receiving unit of the first receiving and emitting element; and
the first objective lens and the second collimating means have a third magnification for converging the laser beam having the third wavelength and reflected by the optical disc to the light receiving unit of the second receiving and emitting element.

10. The optical pickup device according to claim 8, wherein
the laser beam having the first wavelength is a laser beam having a wavelength of 660 nm band, the laser beam having the second wavelength is a laser beam having a wavelength of 405 nm band, and the laser beam having the third wavelength is a laser beam having a wavelength of 785 nm band.

11. The optical pickup device according to claim 8, wherein the first and the second collimating means are collimator lenses.

12. A recorder and/or reproducer comprising:
a first light receiving and emitting element having a first light emitting unit that emits a laser beam having a first wavelength and a laser beam having a second wavelength different from the first wavelength, and a light receiving unit that receives a returning laser beam having the first wavelength and the laser beam having the second wavelength reflected by an optical disc;
a second light receiving and emitting element having a second light emitting unit that emits a laser beam having a third wavelength longer than the first and second wavelengths, and a light receiving unit that receives a returning laser beam having the third wavelength and reflected by the optical disc;
first collimating means for transmitting the laser beam having the first wavelength and the laser beam having the second wavelength;
second collimating means for transmitting the laser beam having the third wavelength;
a first objective lens that transmits the laser beam having the first wavelength transmitted through the first collimating means or the laser beam having the third wavelength transmitted through the second collimating means; and
a second objective lens that transmits the laser beam having the second wavelength transmitted through the first collimating means.

13. A recorder and/or reproducer according to claim 12, wherein
the first objective lens and the first collimating means have a first magnification for converging the laser beam having the first wavelength and reflected by the optical disc to the light receiving unit of the first light receiving and emitting element;
the second objective lens and the first collimating means have a second magnification for converging the laser beam having the second wavelength and reflected by the optical disc to the light receiving unit of the first light receiving and emitting element; and
the first objective lens and the second collimating means have a third magnification for converging the laser beam having the third wavelength and reflected by the optical disc to the light receiving unit of the second light receiving and emitting element.

14. An optical pickup device comprising:
a first light emitting unit that emits a laser beam having a first wavelength and a laser beam having a second wavelength different from the first wavelength;
a second light emitting unit that emits a laser beam having a third wavelength longer than the first and second wavelengths;
a first collimating section that transmits the laser beam having the first wavelength and the laser beam having the second wavelength;
a second collimating section that transmits the laser beam having the third wavelength;
a first objective lens that transmits the laser beam having the first wavelength transmitted through the first collimating section or the laser beam having the third wavelength transmitted through the second collimating section; and
a second objective lens that transmits the laser beam having the second wavelength transmitted through the first collimating section.

15. A recorder and/or reproducer comprising:
a first light emitting unit that emits a laser beam having a first wavelength and a laser beam having a second wavelength different from the first wavelength;
a second light emitting unit that emits a laser beam having a third wavelength longer than the first and second wavelengths;
a first collimating section that transmits the laser beam having the first wavelength and the laser beam having the second wavelength;
a second collimating section that transmits the laser beam having the third wavelength;
a first objective lens that transmits the laser beam having the first wavelength transmitted through the first collimating section or the laser beam having the third wavelength transmitted through the second collimating section; and
a second objective lens that transmits the laser beam having the second wavelength transmitted through the first collimating section.

16. An optical pickup device comprising:
a first light receiving and emitting element having a first light emitting unit that emits a laser beam having a first wavelength and a laser beam having a second wavelength different from the first wavelength and a light receiving unit that receives the returning laser beam having the first wavelength and the laser beam having the second wavelength reflected by the optical disk;
a second light receiving and emitting element having a second light emitting unit that emits a laser beam having a third wavelength longer than the first and second wavelengths and a light receiving unit that receives the returning laser beam having the third wavelength and reflected by the optical disc;
a first collimating section that transmits the laser beam having the first wavelength and the laser beam having the second wavelength;
a second collimating section that transmits the laser beam having the third wavelength;
a first objective lens that transmits the laser beam having the first wavelength transmitted through the first collimating section or the laser beam having the third wavelength transmitted through the second collimating section; and
a second objective lens that transmits the laser beam having the second wavelength transmitted through the first collimating section.

17. A recorder and/or reproducer comprising:
a first light receiving and emitting element having a first light emitting unit that emits a laser beam having a first wavelength and a laser beam having a second wavelength different from the first wavelength, and a light receiving unit that receives the returning laser beam having the first wavelength and the laser beam having the second wavelength reflected by an optical disk;
a second light receiving and emitting element having a second light emitting unit that emits a laser beam having a third wavelength longer than the first and second wavelengths, and a light receiving unit that receives the returning laser beam having the third wavelength and reflected by the optical disc;

a first collimating section that transmits the laser beam having the first wavelength and the laser beam having the second wavelength;

a second collimating section that transmits the laser beam having the third wavelength;

a first objective lens that transmits the laser beam having the first wavelength transmitted through the first collimating section or the laser beam having the third wavelength transmitted through the second collimating section; and a second objective lens that transmits the laser beam having the second wavelength transmitted through the first collimating section.

* * * * *